US012586005B2

(12) United States Patent
Kirsanov et al.

(10) Patent No.: US 12,586,005 B2
(45) Date of Patent: Mar. 24, 2026

(54) CLIENT CREATION OF CONDITIONAL SEGMENTS

(71) Applicant: Vista Tech LLC, Fort Lauderdale, FL (US)

(72) Inventors: Mikhail Kirsanov, Fort Lauderdale, FL (US); Sergey Petrossov, Fort Lauderdale, FL (US)

(73) Assignee: Vista Tech LLC, Fort Lauderdale, FL (US)

( * ) Notice: Subject to any disclaimer, the term of this patent is extended or adjusted under 35 U.S.C. 154(b) by 0 days.

(21) Appl. No.: 18/120,044

(22) Filed: Mar. 10, 2023

(65) Prior Publication Data

US 2023/0281523 A1     Sep. 7, 2023

Related U.S. Application Data

(63) Continuation of application No. 17/397,151, filed on Aug. 9, 2021, now Pat. No. 11,615,351, which is a
(Continued)

(51) Int. Cl.
G06Q 10/02          (2012.01)
G06Q 10/0631        (2023.01)
G06Q 50/40          (2024.01)

(52) U.S. Cl.
CPC ........... *G06Q 10/025* (2013.01); *G06Q 10/02* (2013.01); *G06Q 10/06314* (2013.01); *G06Q 50/40* (2024.01)

(58) Field of Classification Search
None
See application file for complete search history.

(56) References Cited

U.S. PATENT DOCUMENTS 5,948,040 A      9/1999  Delorme et al.
6,134,534 A  *  10/2000  Walker ................... G06Q 30/02
                                                                705/37
(Continued)

FOREIGN PATENT DOCUMENTS

FR          2905488          3/2008
FR          3021108          11/2015
(Continued)

OTHER PUBLICATIONS

Goulas et al., ERMIS: A Helicopter Taxi Company Software Support System based on GPS, GSM and Web Services (Year: 2006).*
(Continued)

*Primary Examiner* — Mohamed N El-Bathy
(74) *Attorney, Agent, or Firm* — Fish & Richardson P.C.

(57)          ABSTRACT

Methods, systems, and apparatus, including computer programs encoded on a computer storage medium, that enable clients to create custom conditional segments on which other clients can claim a spot. In one aspect, a front-end server receives, over a data communication network and from an electronic device of a creator, one or more data packets that specify attributes of a segment created by the creator through a graphical interface presented at the electronic device. A back-end server detects, based on data received from the device, interaction with an interface control that designates the segment as a conditional segment and, in response obtains, from the device, an expiration time specifying how long the conditional segment is available to others. After obtaining the expiration time, clients are notified that the conditional segment is available and enabled to claim a spot on the conditional segment through a client-side application.

20 Claims, 11 Drawing Sheets

Related U.S. Application Data continuation of application No. 15/916,102, filed on Mar. 8, 2018, now Pat. No. 11,093,868.

(56) References Cited

U.S. PATENT DOCUMENTS

| | | | |
|---|---|---|---|
| 6,813,777 B1 | 11/2004 | Weinberger et al. | |
| 7,028,304 B1 | 4/2006 | Weinberger et al. | |
| 7,346,526 B2 | 3/2008 | Daughtrey et al. | |
| 8,788,303 B1 | 7/2014 | Krone et al. | |
| 10,490,087 B2 | 11/2019 | Dennerline | |
| 10,762,447 B2 * | 9/2020 | Kislovskiy | G06Q 10/02 |
| 11,126,934 B2 | 9/2021 | Bayer et al. | |
| 11,213,723 B2 | 1/2022 | Bouck | |
| 11,397,719 B1 * | 7/2022 | Khoyilar | H04L 51/216 |
| 2002/0013718 A1 | 1/2002 | Cornwell | |
| 2003/0139950 A1 | 7/2003 | Daum | |
| 2004/0030593 A1 | 2/2004 | Webster et al. | |
| 2004/0225953 A1 | 11/2004 | Rank et al. | |
| 2004/0230451 A1 | 11/2004 | Figa | |
| 2004/0267580 A1 | 12/2004 | Becker | |
| 2006/0020496 A1 | 1/2006 | Azzarello et al. | |
| 2006/0046718 A1 | 3/2006 | Gevalt | |
| 2007/0244730 A1 | 10/2007 | Johnson et al. | |
| 2008/0189734 A1 * | 8/2008 | Schepers | G06Q 10/0631 |
| | | | 725/32 |
| 2009/0044004 A1 | 2/2009 | Wang et al. | |
| 2009/0216600 A1 | 8/2009 | Hill | |
| 2009/0326990 A1 * | 12/2009 | Ashby | G06Q 10/02 |
| | | | 705/5 |
| 2011/0054956 A1 | 3/2011 | Meyer et al. | |
| 2011/0093301 A1 | 4/2011 | Walker | |
| 2011/0166898 A1 | 7/2011 | Zarrow | |
| 2012/0022901 A1 * | 1/2012 | Nasr | G06Q 10/02 |
| | | | 705/5 |
| 2012/0209636 A1 | 8/2012 | Sloan et al. | |
| 2013/0103437 A1 | 4/2013 | Nelson | |
| 2013/0226634 A1 | 8/2013 | Jackson et al. | |
| 2013/0268447 A1 | 10/2013 | Stephens et al. | |
| 2014/0052714 A1 | 2/2014 | Brodziak et al. | |
| 2014/0058884 A1 | 2/2014 | Goldstein et al. | |
| 2014/0162598 A1 | 6/2014 | Villa-Real | |
| 2014/0180732 A1 | 6/2014 | Rotchin et al. | |
| 2014/0180733 A1 | 6/2014 | Rotchin et al. | |
| 2014/0180736 A1 | 6/2014 | Walker | |
| 2014/0379389 A1 * | 12/2014 | Bornat | G06Q 10/02 |
| | | | 705/5 |
| 2015/0066342 A1 * | 3/2015 | Garzella | G06Q 10/06311 |
| | | | 434/30 |
| 2015/0127393 A1 * | 5/2015 | Turner | G06Q 10/02 |
| | | | 705/5 |
| 2016/0012445 A1 | 1/2016 | Villa-Real | |
| 2016/0110660 A1 | 4/2016 | Daughtrey et al. | |
| 2016/0203422 A1 | 7/2016 | Demarchi et al. | |
| 2016/0247097 A1 | 8/2016 | Jackson et al. | |
| 2017/0124489 A1 | 5/2017 | Leavitt et al. | |
| 2017/0140654 A1 | 5/2017 | Dennerline | |
| 2017/0293950 A1 | 10/2017 | Rathod | |
| 2018/0061243 A1 | 3/2018 | Shloosh | |
| 2019/0228351 A1 | 7/2019 | Simpson et al. | |
| 2020/0182637 A1 | 6/2020 | Kumar et al. | |

FOREIGN PATENT DOCUMENTS

| | | | | |
|---|---|---|---|---|
| GB | 2479051 A * | 9/2011 | | B64F 1/366 |
| WO | WO 2005/081625 | 9/2005 | | |
| WO | WO 2012/093618 | 7/2012 | | |
| WO | WO-2014055303 A1 * | 4/2014 | | G06Q 50/14 |
| WO | WO 2015/187930 | 12/2015 | | |
| WO | WO-2017145052 A2 * | 8/2017 | | G06Q 10/02 |
| WO | WO 2017/173416 | 10/2017 | | |
| WO | WO 2017/173417 | 10/2017 | | |
| WO | WO-2018160724 A1 * | 9/2018 | | G01C 21/3664 |
| WO | WO-2019096186 A1 * | 5/2019 | | H04L 12/189 |

OTHER PUBLICATIONS

Enciso et al., Modeling and Simulation of Passenger Traffic in a National Airport (Year: 2016).*

Mahmoudi et al., Finding optimal solutions for vehicle routing problem with pickup and delivery services with time windows: A dynamic programming approach based on state-space-time network representations (Year: 2015).*

McGinley et al., On reservation systems and queueing systems (Year: 2014).*

Vukmirovic et al., Utilizing ontologies in an agent-based airline ticket auctioning system (Year: 2006).*

Compilation of Non Patent Literature articles and YouTube videos considered; dates ranging from 2016 and earlier.

Koeners et al., "Analyze Possible Benefits of Real-Time Flow Optimization Using Actual Data" (2011), downloaded on Apr. 10, 2021.

International Search Report and Written Opinion for App. No. PCT/US2019/015370, dated Mar. 28, 2019, 13 pages.

International Preliminary Report on Patentability for App. No. PCT/US2019/015370, dated Sep. 8, 2020, 10 pages.

Foina et al, An Unmanned Aerial Traffic Management Solution for Cities Using an Air Parcel Model, 2015 International Conference on Unmanned Aircraft Systems (ICUAS), Jun. 9-12, 2015, 6 pages.

Kahn, Jordan, "Review: Fantastical for iPhone, the calendar upgrade IOS 6 is missing," Nov. 29, 2012, 11 pages.

Wynbrandt, James, "Inside Charters: Buying Charter by the Seat," Business Jet Traveler, Sep. 2013, 4 pages.

* cited by examiner

200

300

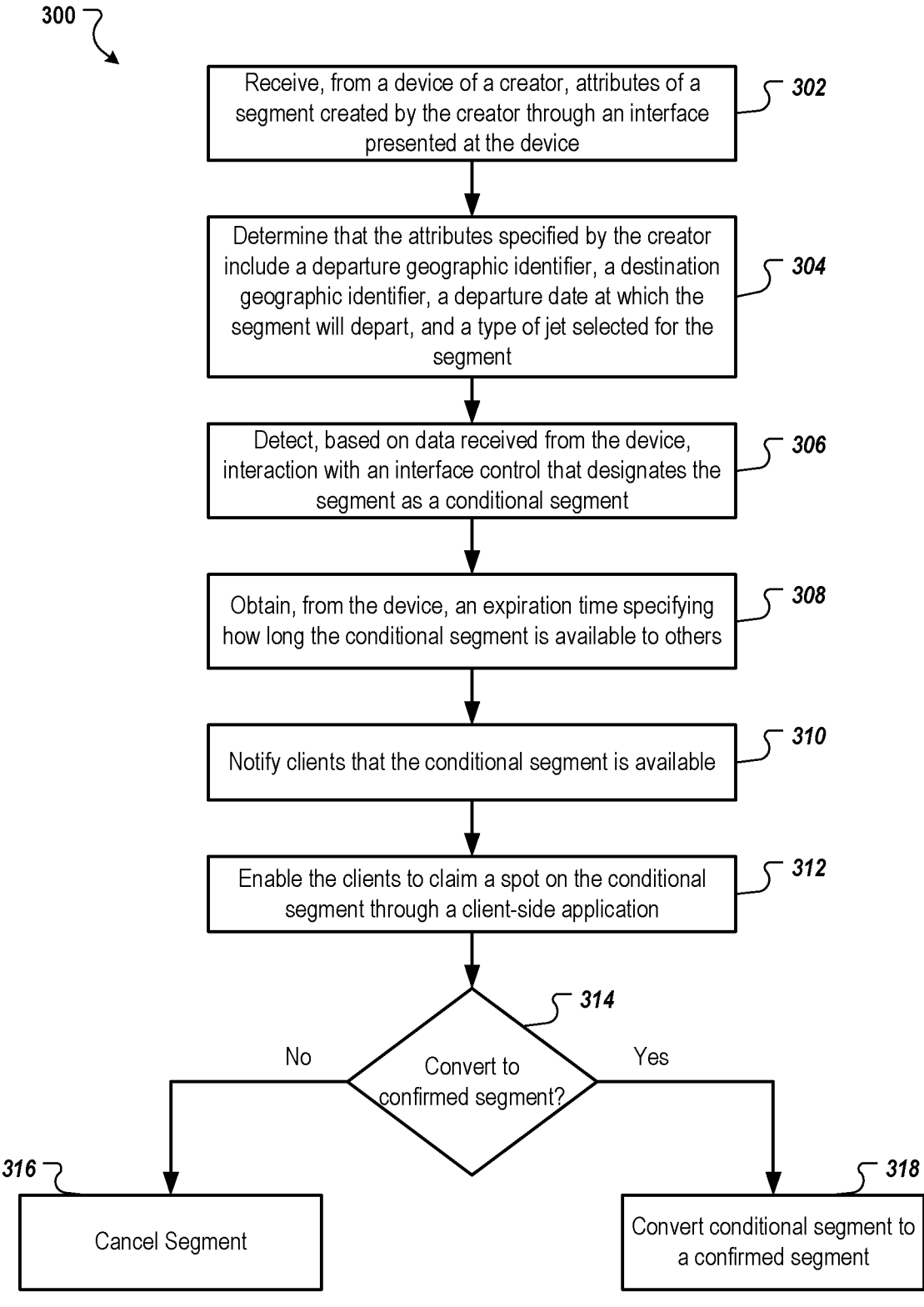

302 — Receive, from a device of a creator, attributes of a segment created by the creator through an interface presented at the device 304 — Determine that the attributes specified by the creator include a departure geographic identifier, a destination geographic identifier, a departure date at which the segment will depart, and a type of jet selected for the segment 306 — Detect, based on data received from the device, interaction with an interface control that designates the segment as a conditional segment 308 — Obtain, from the device, an expiration time specifying how long the conditional segment is available to others 310 — Notify clients that the conditional segment is available 312 — Enable the clients to claim a spot on the conditional segment through a client-side application 314 — Convert to confirmed segment?

No

Yes

316 — Cancel Segment

318 — Convert conditional segment to a confirmed segment

CUSTOM SHUTTLE

CUSTOM SHUTTLE

PENDING     EXPIRES in 0 hrs

HEAVY JET HEAVY 10 SEATS     8
08:45 AM     FIRST 3 SEATS FREE     EXTRA SEAT $2,260

KFLL ✈ KHPN
FORT LAUDERDALE     WHITE PLAINS
~ 08:45 AM     ~ 11:30 AM
FRI, APR 27     FRI, APR 27

DEPARTURE     ARRIVAL
Davie     New Roce
Hollywood     Yonkers
Pines

PURCHASE | $0 + 1T

SEATS SELECTED
1     2:24

CLIENT CREATION OF CONDITIONAL SEGMENTS

CROSS REFERENCE TO RELATED APPLICATIONS

This application is a continuation, and claims the benefit of priority under U.S.C. 120, of U.S. application Ser. No. 17/397,151, filed on Aug. 9, 2021, which is a continuation of U.S. application Ser. No. 15/916,102, filed on Mar. 8, 2018 (now U.S. Pat. No. 11,093,868), which are hereby incorporated by reference.

BACKGROUND

This specification relates to a computing platform that enables clients to create custom conditional segments on which other clients can claim a spot.

In general, segments are typically scheduled by operators at particular times and between particular geographic locations. If a person would like to travel between two locations, the person would generally be required to select from the pre-scheduled segments, which may not include a segment that matches the person's current travel needs.

SUMMARY

In general, one innovative aspect of the subject matter described in this specification can be embodied in systems that include one or more front-end servers that receive, over a data communication network and from an electronic device of a creator, one or more data packets that specify attributes of a segment created by the creator through a graphical interface presented at the electronic device. The system also includes one or more back-end servers in data communication with the one or more front-send servers and that include one or more data processing engines, including a segment scheduling engine. The back-end server(s) can be configured to determine that the attributes specified by the creator include a departure geographic identifier, a destination geographic identifier, a departure date at which the segment will depart, and a type of jet selected for the segment. The back-end server(s) can detect, based on data received from the electronic device, interaction with an interface control that designates the segment as a conditional segment. In response to detecting the interaction with the interface control designating the segment as a conditional segment, the back-end server(s) can obtain, from the electronic device, an expiration time specifying how long the conditional segment is available to others. After obtaining the expiration time, the back-end server(s) can cause the one or more front-end servers to notify clients that the conditional segment is available and enable the clients to claim a spot on the conditional segment through a client-side application. The back-end server(s) can determine whether to convert the conditional segment to a confirmed segment based on a number of spots claimed by the clients on the conditional segment. The back-end server(s) can convert the conditional segment to the confirmed segment when at least a minimum specified number of spots have been claimed prior to the expiration time and cancel the conditional segment when fewer than the minimum specified number of spots have been claimed as of the expiration time. Other embodiments of this aspect include corresponding methods, apparatus, and computer programs, configured to perform the actions of the methods, encoded on computer storage devices.

These and other embodiments can each optionally include one or more of the following features. The front-end server(s) can obtain, from the creator, a number of spots being claimed by the creator. The back-end server(s) can compare the number of spots being claimed by the creator to a number of spots required to designate the conditional segment as a confirmed segment. Notifying clients that the conditional segment is available includes providing a graphical indication to the clients specifying how many more spots need to be claimed to convert the conditional segment to the confirmed segment.

In some aspects, notifying the clients that the conditional segment is available includes updating a calendar interface to include a dot representing the conditional segment below a calendar entry corresponding to the departure date. The front-end server(s) can change a color of the dot representing the conditional segment to a first color representing the confirmed segment in response to the minimum specified number of spots being claimed. The front-end server(s) can also change a color of the dot representing the conditional segment to a second color representing a full segment in response to all spots having been claimed.

In some aspects, notifying the clients that the conditional segment is available includes updating an interface presented to the clients to include information specifying one or more of the attributes of the conditional segment and information identifying the conditional segment as a user-created segment. Notifying the clients that the conditional segment is available can include updating the interface presented to the clients to include information specifying the expiration time.

Particular embodiments of the subject matter described in this specification can be implemented so as to realize one or more of the following advantages. Enabling clients to create and schedule conditional segments gives clients flexibility in scheduling segments that are at times convenient to the clients while preventing situations in which the client may be responsible for the entire segment. This also results in an increased quantity of possible segments on which other clients can claim a spot, resulting in more flexibility and more options not only for the creator but also for the other clients.

A robust computing platform that connects client devices to real time data about conditional segments increases the likelihood that the conditional segments are converted to confirmed segments. For example, by updating in real time calendar interfaces that visually identify conditional segments that are pending for all clients to view ensures that the information reaches all clients that are potentially interested in claiming a spot on the segment. In addition, sending push notifications to clients that are likely to claim a spot on a conditional segment further increases the likelihood that the conditional segment will be converted to a confirmed segment.

The computing platform facilitates crowdsourcing the creation of segments that require a minimum number of spots to create a client-initiated segment. For example, by notifying other clients of a creator's initiation of a conditional segment allows for other clients to co-create the segment and convert the conditional segment to a confirmed segment on which each co-creator and other clients can travel. Without such a platform, clients would be limited to scheduled segments or be responsible for each of the minimum number of spots required to schedule a client-initiated segment.

Aspects of the platform's interfaces provide a consistent experience for the clients that allows the clients to identify suitable segments without navigating to many different interfaces or application pages. For example, a calendar interface that presents color-coded dots that represent the different types of segments under their respective departure dates allows a user to quickly and easily identify all of the suitable segments over a given time period and to identify those that have availability. As such, the user interfaces discussed herein directly provide users information about segment availability and whether segments on a given day are confirmed, pending, or full without requiring the users to navigate to multiple different user interface screens in order to obtain the information. This also prevents the users from unnecessarily navigating to a user interface for a particular day when there are no conditional and/or available segments on that day. As such, the user interfaces discussed herein provide a more efficient workflow and presentation of information to the users.

Allowing creators to specify an expiration time for conditional segments provides enhanced flexibility for the creators and allows the creators to give themselves enough time to arrange other travel plans if the conditional segment is cancelled rather than confirmed. The creators can specify the expiration time based on their personal needs and their ability to obtain alternative travel arrangements which may differ from other creators.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3 is a flow chart of an example process for creating and confirming a conditional segment.

Like reference numbers and designations in the various drawings indicate like elements.

DETAILED DESCRIPTION

Figure 1:
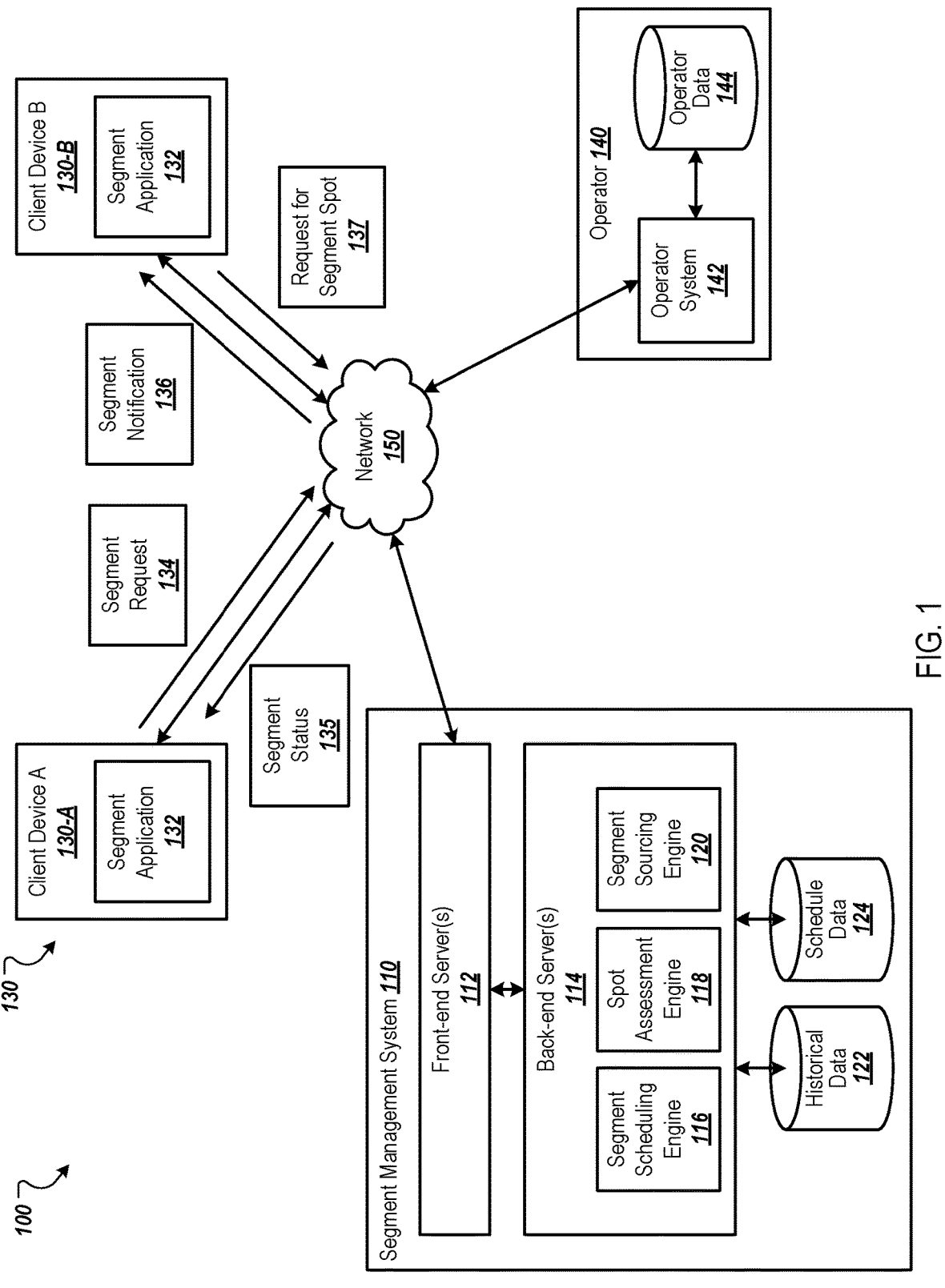
FIG. 1 is a block diagram of an example environment in which a segment management system enables clients to initiate segments, including custom conditional segments.

This document describes methods, systems, devices and computer readable medium that facilitate creation of client-initiated segments, including client-initiated conditional segments. As used throughout this document, a segment refers to a flight between an origin and a destination. The term segment refers to any type of flight that carries clients, including shuttles (e.g., a flight between a set of locations specified by the service provider) and charters (e.g., a flight between two locations freely specified by a client). As described in detail below, the segment can be initiated by a client (e.g., a member of a service and/or a user of an application that facilitates creation of the segment), and made available to other clients, for example, by way of a native mobile application (or another appropriate interactive environment, such as a web interface). The aircraft used to travel between the origin and destination is typically a non-commercial aircraft (e.g., a private jet). While any appropriate type of aircraft (e.g., a propeller aircraft, a jet aircraft, or a rotorcraft) can be used, they will be collectively referred to using the term "jet" for brevity.

A conditional segment is a segment that is initiated by a client and contingent on at least a specified number of spots being claimed by one or more other clients (or the client) before the segment will be confirmed. A spot refers to seat or other appropriate area of occupancy for a client on a jet that is used for the segment. A segment service provider may require that at least a specified minimum number of spots are claimed before confirming the segment for the clients. The ability to initiate a conditional segment enables a client to create a segment without being responsible for all of the minimum number of spots. Instead, the segment service provider can notify other clients that the conditional segment is available and allow other clients an opportunity to claim a spot on the segment. If the clients claim at least the minimum number of spots on the segment, the segment service provider can convert the conditional segment to a confirmed segment that will be scheduled for the clients that claimed a spot on the segment. If the segment includes additional spots above the minimum number that have not been claimed, the segment service provider can make those spots available to other clients as well.

In some situations, a conditional segment may only be available to other clients for a specified time period, which may be specified by the client that initiated the conditional segment (or set by the segment service provider). If the time period elapses before the minimum number of spots on the segment are claimed, the segment service provider can cancel the conditional segment. For example, a client may initiate a conditional segment for a particular date and time. By specifying a time period that will elapse a sufficient amount of time prior to the particular date and time, e.g., at least two days prior to the particular date and time, the client will have time to arrange other transportation or adjust their travel plans in the event that the segment is not confirmed. As it may take time for the segment service provider to arrange and position a non-commercial jet in place for the conditional segment, e.g., from a third party operator, the specified time period may be required to elapse at least a specified duration of time before the departure date for the conditional segment.

FIG. 1 is a block diagram of an example environment 100 in which a segment management system 110 enables clients to initiate segments, including conditional segments. The example environment 100 includes a network 150, such as a local area network (LAN), a wide area network (WAN), the Internet, a mobile network, or a combination thereof. The network 150 connects client devices 130 (e.g., client device A 130-A and client device B 130-B) of clients, the segment management system 110, and operator systems 142 of operators 140. The example environment 100 may include many different client devices 130 and operators 140.

The segment management system 110, which can be operated and maintained by a segment service provider, allows users to arrange transportation on segments provided by the segment service provider. The segment service provider can provide scheduled segments between origins and destinations. The segment service provider can also allow clients (e.g., members of the segment service provided by the segment service provider) to initiate segments with custom attributes (e.g., custom departure date, origin, destination, and/or type of jet). For example, a client may want to travel from an origin to a destination on a day in which the scheduled segment(s) from the origin to the destination are full or on a day that no segments are scheduled from the origin to the destination. In this example, the client can initiate a segment from the origin to the destination on the day and/or time that the client wants to travel. A client that initiates a segment is also referred to as a creator.

Clients can initiate confirmed segments and conditional segments. As described above, a conditional segment is a segment that is contingent on at least a specified minimum number of spots being claimed by the client and optionally one or more other clients. A confirmed segment is a segment that the service provider will guarantee when the creator provides an amount (e.g., pay) for at least the specified number of spots at the time of creation. For example, the segment service provider may require that a minimum of three spots be claimed on a segment between Miami and Dallas. In this example, the creator can create a confirmed segment in which the creator claims at least three spots. As described below, the creator can open some of the creator's claimed spots on a confirmed segment to other clients, e.g., for flight credit. If the creator only wants one or two seats and does not want to provide the amount for all three spots, the creator can create a conditional segment and allow other clients to claim a spot. If at least the minimum number of spots are claimed by the other clients, the segment service provide can convert the conditional segment to a confirmed segment. If not, the segment service provider can cancel the conditional segment (e.g., at the expiration time).

The minimum number of spots can vary between different conditional segments. For example, the segment service provider can require that at least three spots be claimed on one conditional segment while requiring at least five spots be claimed on a different conditional segment. The minimum number of spots can vary based on the total number of spots on the segment, the amount of time between the time at which the segment it initiated and the departure date for the segment, an estimated amount for the segment, and/or other appropriate criteria.

A client can initiate and manage segments, claim a spot on a segment, manage other travel arrangements with the segment management system 110, and/or perform other appropriate tasks related to the segment management system 110 using a client-side application 132 executed on the client's client device 130. The application 132 can transmit data to, and receive data from, the segment management system 110 over the network 150. The application 132 can be implemented as a native application developed for a particular platform or a particular device, web browser that provides a web interface, or another appropriate type of application.

The application 132 can present and detect user interactions with various interfaces that allow the client to initiate conditional segments, manage conditional segments, and/or claim a spot on segments. Some example interfaces generated and presented by the application 132 are illustrated in FIGS. 4A-5E and described in detail below.

The segment management system 110 includes one or more front-end servers 112 and one or more back-end servers 114. The front-end servers 112 can transmit data to, and receive data from, client devices 130, e.g., client device A 130-A and client device B 130-B, and operator systems 142 of operators 140 over the network 150. For example, the front-end servers 112 can provide, to the application 132 of a client's client device 130, interfaces or data for presentation with the interfaces. The front-end servers 112 can also receive data specifying user interactions with the interfaces of the application 130, such as attributes of a conditional segment initiated by the client. As described in more detail below, the front-end servers 112 can update the interfaces, provide new interfaces, and/or update the data presented by the interfaces based on user interactions with the application 132.

The front-end servers 112 can also communicate with the back-end servers 114. For example, the front-end servers 112 can identify data that is to be processed by the back-end servers 114, e.g., data specifying attributes of a conditional segment, and provide the identified data to the back-end servers 114. The front-end servers 112 can also receive, from the back-end servers 114, data for a particular client and transmit the data to the client device 130 of the particular client over the network 150.

The back-end servers 114 include a segment scheduling engine 116, a spot assessment engine 118, and a segment sourcing engine 120. The segment scheduling engine 116 manages the creation, confirmation, and/or cancellation of segments including conditional segments. The segment scheduling engine 116 can receive data specifying attributes of a segment initiated by a client and create the segment within the segment management system 110. For example, a client that uses client device A 130-A can interact with the application 132 to initiate a segment and specify attributes of the segment. The attributes can include a departure geographic identifier (e.g., an origin city or airport code), a destination geographic identifier (e.g., a destination city or airport code), a departure date (which can include a date and/or time) at which the segment will depart from the origin, a type of jet (e.g., light, midsize, heavy, propeller, rotorcraft, etc.), a number of spots the client wants to claim on the segment, and/or other appropriate attributes. As used herein, the term engine refers to a data processing apparatus that performs a set of tasks.

The application 132 can generate a segment request 134 and cause the client device A 130-A to transmit the segment request 134 to the segment management system 110 over the network 150. The segment request 134 can include one or more of the client-specified attributes. In some implementations, the segment request 134 can include all of the attributes. For example, the application 132 can cause the client device A 130-A to transmit the segment request 134 after all of the appropriate attributes have been obtained from the client. As described in more detail below, the application 132 can prompt the client for the attributes using multiple interfaces.

In some implementations, the segment request 134 includes only a portion of the attributes (e.g., less than all of the attributes required by the segment service provider). For example, the segment scheduling engine 116 can cause the application 132 to prompt the client for additional attributes or other information based on initial attributes received in the conditional segment request 134. In a particular example, the segment request 134 can include the departure geographic identifier, destination geographic identifier, and departure date. The segment scheduling engine 116 can receive these attributes, identify what types of jets are available for travel from the origin to the destination, and provide data specifying the available types of jets to the client device A 130-A for presentation by the application 132 to the client. The client can then select from the available types of jets and the application 132 can cause the client device A to transmit data specifying the selected type of jet to the segment management system 110.

The application 132 can also allow the client to designate the segment as a confirmed segment or a conditional segment. For example, when a client creates a segment, the application 132 can present an interface control that allows the client to specify whether the segment should be a confirmed segment or a conditional segment. The application 132 can detect user interaction with the user interface control, determine the type of segment indicated by the user interaction, and provide the data to the segment management system 110.

The segment scheduling engine 116 can receive the data and create the appropriate type of segment within the segment management system 110 based on the data and the attributes received from the client device A 130-A. The segment scheduling engine 116 can also store the data for the created segment in a schedule data storage unit 124. The schedule data storage unit 124 can include one or more databases (or other appropriate data storage structures) stored in one or more non-transitory data storage media (e.g., hard drive(s), flash memory, etc.).

The segment data storage unit 124 can store data for each segment that is provided by the segment service provider. For example, the segment data storage unit 124 can store data for each scheduled and each client-initiated segment. The data for each segment can include the departure geographic identifier for the segment, the destination geographic identifier for the segment, the departure date for the segment, the type of jet and/or an identifier of the actual jet being used for the segment, an identifier for each client that has claimed a spot on the segment, and/or other appropriate segment data. The data for each segment can also include data specifying whether the segment is a client-initiated segment, whether the segment is confirmed or conditional, and, if the segment is conditional, an expiration time for the segment.

As described above, a conditional segment be cancelled after a specified expiration time to allow the creator time to arrange other transportation or travel plans and/or to allow the segment service provider time to arrange and position a non-commercial jet in place for the conditional segment. If the client designates the segment as a conditional segment, the application 132 can prompt the client to specify the expiration time for the conditional segment. The expiration time is a duration of time that the conditional segment is available to other clients before the conditional segment is cancelled if fewer than the specified minimum number of spots on the conditional segment are claimed. For example, the application 132 can present an interface control that allows the client to specify the expiration time in response to the client designating the segment as a conditional segment. The application 132 can detect user interaction with the interface control, determine the expiration time designated by the client using the interface control, and transmit, to the segment management system 110, data specifying the expiration time.

In some implementations, the segment scheduling engine 116 limits the expiration time to a maximum time period. The segment scheduling engine 116 can set the maximum time period such that the conditional segment will either be converted to a confirmed segment or be cancelled at least a threshold duration of time prior to the departure date for the conditional segment. This allows the segment service provider time to source a jet for the segment from one or the operators 140 if the conditional segment is converted to a confirmed segment.

The maximum time period can be based on the time at which the conditional segment is initiated and the departure date for the conditional segment. For example, the segment scheduling engine 116 may require that a conditional segment either be converted to a confirmed segment or be cancelled at least two days prior to the departure date. If the creator initiates the conditional segment three days prior to the departure date, the maximum time period may be one day (e.g., three days–two days).

The segment scheduling engine 116 can notify other clients of the created segment. In some implementations, clients can view the various segments from an origin to a destination. For example, the application 132 can present segments from an origin to a destination using a calendar interface. The calendar interface can include, for each date, zero or more segment indicators for each segment scheduled (or conditional) to travel from the origin to the destination on that date. For example, each segment indicator may be a dot under the date in the calendar. In this example, after the segment is created, a segment indicator will be presented under the departure date for the segment to represent the created segment. If a different client is viewing the calendar interface for flights from the same origin and to the same destination as the created segment, the client can see the dot for the created segment and interact with the dot or the date (e.g., by selecting the dot or the date) to view more information about the created segment and/or claim a spot on the created segment.

In some implementations, the segment scheduling engine 116 notifies clients using push segment notifications 136 (and/or through client navigation of the application, as discussed in more detail below). For example, the segment scheduling engine 116 may send messages (e.g., within the application 132, via text messaging, and/or via e-mail) to the clients to notify the clients of the created segment. The messages can include a link to an application page within the application 132 (or to a web page in a web interface) to claim a spot on the segment. In some implementations, the segment scheduling engine 116 sends the notifications 136 to clients that are likely to be interested in the created segment, e.g., based on previous segments on which the clients were passengers, the location of the clients, and/or favorite locations specified by the clients (e.g., using the application 132). Data regarding previous segments on which clients were passengers is stored in a historical data storage unit 122, e.g., as part of data regarding each previously operated segment.

A client, e.g., the client associated with (e.g., logged into the application 132 on) the client device B 130-B, can request a spot on a conditional segment using the application 132. For example, the client can interact with a segment indicator for the segment in a calendar interface, select a link in a push notification, or another appropriate way. The application 132 can then generate a request for a segment spot 137 and transmit the request for the segment spot 137 to the segment management system 110. The request for the segment spot 137 can include data specifying the client that submitted the request and an identifier of the segment on which the client is requesting a spot.

The segment scheduling engine 116 can receive the request for the segment spot 137 and determine whether there is still a spot available on the conditional segment. For example, there may not be a spot available if the conditional segment has expired or if other clients have claimed all of the available spots. If there is still a spot available on the conditional segment, the segment scheduling engine 116 can add the client that submitted the request for the segment spot 137 to the conditional segment. If not, the segment scheduling engine 116 can send a notification to the client that the segment is no longer available, e.g., on an interface of the application 132.

If the segment scheduling engine 116 adds the client to the conditional segment, the segment scheduling engine 116 can determine whether to convert the conditional segment to a confirmed segment. For example, the segment scheduling engine 116 can compare the number of spots that have been claimed on the conditional segment to the specified minimum number of spots that have to be claimed to convert the conditional segment to a confirmed segment. If the number of spots that have been claimed on the conditional segment meets or exceeds the minimum number of spots, the segment scheduling engine 116 can convert the conditional segment to a confirmed segment. If not, the segment scheduling engine 116 can maintain the conditional segment as a conditional segment until the specified number of spots on the segment are claimed or the expiration time elapses.

The segment scheduling engine 116 can provide segment status notifications 135 to the client that created the conditional segment and/or the clients that claimed a spot on the conditional segment. For example, the segment scheduling engine 116 can provide segment status notification 135 in response to the conditional segment either being cancelled (e.g., to notify the clients of the cancellation) or being confirmed (e.g., to notify the clients that the segment has been confirmed). Each client that claimed a spot on the segment may have provided a respective amount to claim the spot on the segment. If the conditional segment is cancelled, the segment management system 110 can return the respective amount to each client.

After converting a conditional segment to a confirmed segment, the segment scheduling engine 116 can allow other clients to claim a spot on the confirmed segment if there are additional spot(s) available. For example, the minimum number of spots required to convert the conditional segment to a confirmed segment may be less than all of the spots on the actual jet being used for the segment. The segment scheduling engine 116 can continue presenting a segment indicator (e.g., dot) for the segment in the calendar interface and/or send notifications to clients that spots are available on the confirmed segment. As described in more detail below, the color of the segment indicator for a confirmed segment may be different from the color of the segment indicator for a conditional segment to allow a client to quickly and easily determine the types of segments available on each date without requiring client interaction with the presented date or otherwise navigating to another user interface that provides more detailed information about the segments available on each date.

The segment management system 110 also includes a spot assessment engine 118. The spot assessment engine 118 can determine an amount that clients are required to submit for each spot on a segment. The amount can be based on various factors, such as the type of jet, the departure and destination geographic identifiers, the departure date, the duration of time between the time the segment is initiated and the departure date, the type of segment (e.g., conditional or confirmed), and/or other appropriate factors. The application 132 can present the amount for a spot at the interfaces that enable the clients to initiate a segment and/or to claim a spot on a segment. For example, the application 132 can request current amounts for a particular segment from the spot assessment engine 118 in response to a client selecting to view information about the particular segment. In another example, the application 132 can request the information before the client selection, e.g., when the client opens the application 132, when the client selects the same origin and destination as the particular segment, or periodically. In this way, the latency in presenting the information can be reduced.

The segment management system 110 also includes a segment sourcing engine 120. The segment sourcing engine 120 can interact with the operator systems 142 of the operators 140 to select jets for the segments and obtain information about the jets (e.g., number of spots on the jet, costs for particular segments, range, etc.). For example, when the segment scheduling engine 116 creates a segment (e.g., a confirmed segment), the segment sourcing engine 120 can interact with the operator systems 142 to identify a jet of the same type as the created segment that can be used for the segment. For example, the segment sourcing engine 120 can submit a request to each operator system 142 for a jet of the type of the created segment.

In response to receiving a request, the operator systems 142 can obtain data regarding available jets from their respective operator data storage units 144 and provide, to the segment sourcing engine 120 the information about any available jets that the operator 140 would be willing to operate for the created segment (e.g., number of spots on the jet, costs for particular segments, range, etc.). If multiple operators 140 have an available jet, the segment sourcing engine 120 can select a jet for the created segment based on the information provided by the operator systems 142.

In some implementations, the front-end servers 112 of the segment management system 110 communicate with the operators systems using application programming interfaces (APIs). The use of the APIs require computational power to communicate data. To reduce the amount of computational power used by the APIs, the segment management system 110 may identify a subset (e.g., less than all) of operators 140 for a particular segment and provide the request to only the operators in the subset. The segment management system 110 can identify the subset of operators based on the departure geographic identifier (e.g., identify operators that operate jets in the geographic area from which the segment will depart), previous segments provided by the operators (e.g., previously provided a jet for the same origin and destination), types of jets that the operator operates, and/or other appropriate criteria. In some implementations, communications with operators can be carried out using other communications means (e.g., phone).

Figure 2:
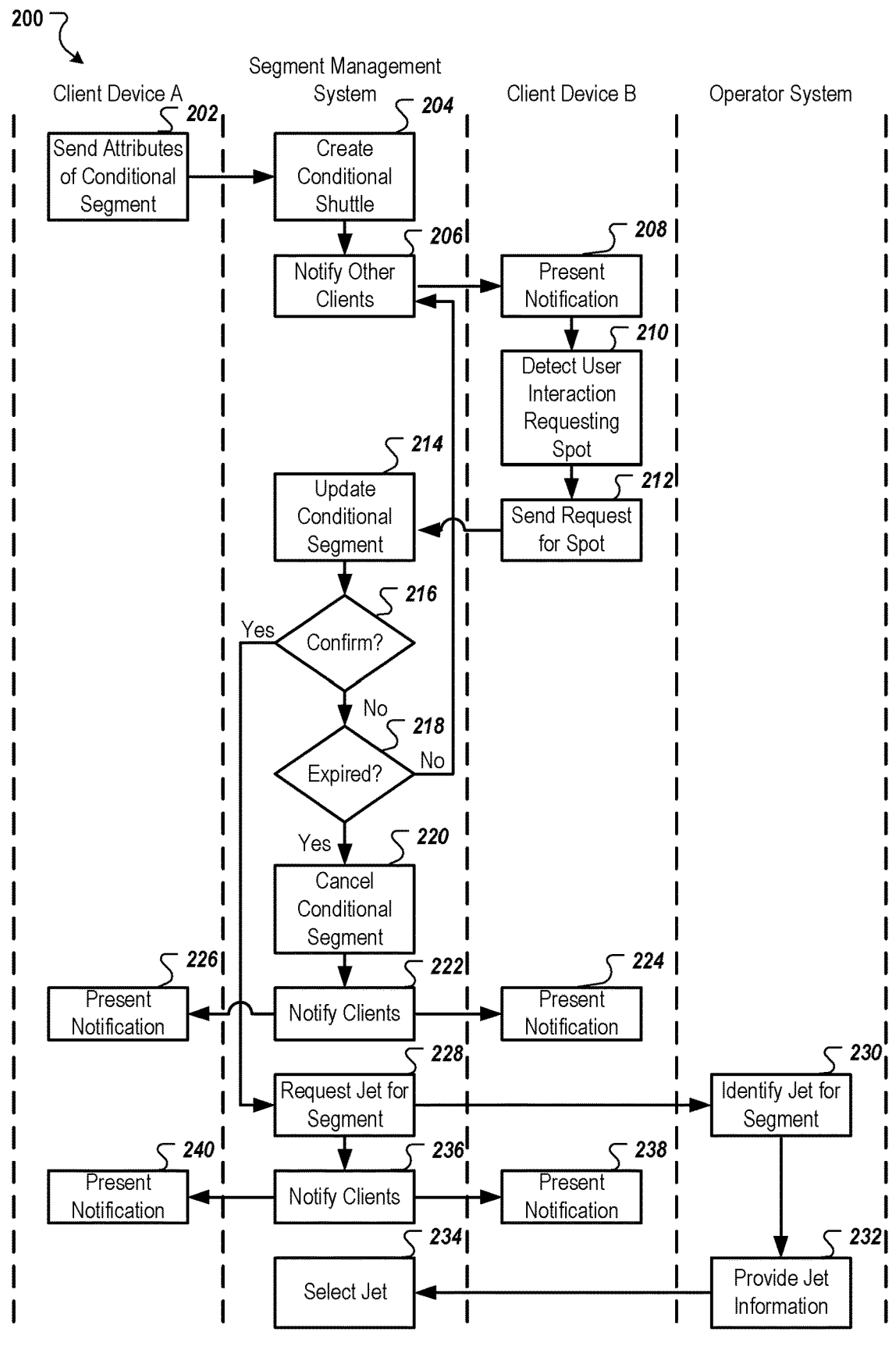
FIG. 2 is a swim lane diagram that illustrates an example process for creating and either confirming or cancelling a conditional segment.

FIG. 2 is a swim lane diagram that illustrates an example process 200 for creating and either confirming or cancelling a conditional segment. The operations of the process 200 are described with reference to the segment management system 110, the client device A 130-A, client device B 130-B, and the operator system 142 of FIG. 1.

The client device A 130-A sends attributes of a conditional segment to the segment management system 110 (202). For example, a client associated with the client device A 130-A can initiate a conditional segment using the application 132. The application 132 can enable the client to specify attributes of the conditional segment. As described above, the attributes can include a departure geographic identifier, a destination geographic identifier, a departure date, a type of jet, a number of spots the client is claiming on the segment, and/or other appropriate attributes. The attributes can also include an expiration time for the conditional segment. For example, the application 132 may prompt the client to specify an expiration time for the conditional segment in response to the client designating the segment as a conditional segment.

The segment management system 204 creates the conditional segment based on the attributes received from the client device A 130-A (204). The segment management system 204 can create the conditional segment within the system so that other clients can view information about the segment and/or claim a spot on the segment. For example, when the application 132 executing on other clients' devices requests information about segments, the segment management system 110 can provide information about the created conditional segment for presentation by the application 132 to the client.

The segment management system 110 notifies other clients about the conditional segment (206). For example, the segment management system 110 can send information about the conditional segment to other clients that may be interested in claiming a spot on the conditional segment. The segment scheduling engine 116 may send messages (e.g., within the application 132, via text messaging, and/or via e-mail) to the clients to notify the clients of the conditional segment.

The client device B 130-B receives the notification and presents information about the conditional segment to the client associated with the client device B 130-B (208). If the notification is in the form of a message within the application 132, the application 132 executing on the client device B 130-B can present a message indicator that indicates that a new message has been received. The client can interact with the message indicator (e.g., select the message indicator) to open the message and view information about the conditional segment.

The notification can also be in the form of a segment indicator on a calendar interface that presents segments that are to travel from a particular origin to a particular destination. The client can interact with the segment indicator (e.g., select the segment indicator) to view information about the conditional segment.

The application 132 executing on the client device B 130-B detects a user interaction requesting a spot on the conditional segment (210). For example, the client can select a spot on the segment while viewing information about the segment. Example interfaces that show the selection of a spot on a segment are illustrated in FIGS. 5A-5E and described below.

The client device B 130-B sends the request for the spot to the segment management system 110 (212). The segment management system 110 receives the request and updates the conditional segment (214). The segment management system 110 can update the conditional segment to reflect the spot claimed by the client associated with the client device B. For example, the segment management system 110 can update the list of clients that are to travel on the segment and the number of spots claimed by the clients.

The segment management system 110 determines whether to convert the segment to a confirmed segment (216). As described above, the segment service provider may require that at least a specified minimum number of spots on a conditional segment be claimed to convert the conditional segment to a confirmed segment. The segment management system 110 can compare the number of spots that have been claimed to the specified number of spots for the conditional segment.

If the number of spots that have been claimed does not meet or exceed the specified number of spots, the segment management system 110 can determine to not convert the conditional segment to a confirmed segment at that time. Instead, the segment management system 110 can maintain the segment as a conditional segment until either the specified number of spots on the segment are claimed or the expiration time elapses.

If the number of spots that have been claimed does not meet or exceed the specified number of spots, the segment management system 110, the segment management system

110 determines whether the expiration time has elapsed (218). If not, the segment management system 110 can continue maintaining the segment as a conditional segment until the expiration time elapses. The segment management system 110 can also notify other clients of the conditional segment so that other clients can claim a spot on the segment to enable the segment to be converted to a confirmed segment.

If the expiration time has elapsed, the segment management system 110 cancels the conditional segment (220). The segment management system 110 notifies the client that created the conditional segment and the client(s) that claimed a spot on the conditional segment that the conditional segment has been cancelled (222). For example, the segment management system 110 can send messages to the clients notifying the clients of the cancellation. The application 132 executing on the client device A 130-A presents the notification to the client that created the segment (226). Similarly, the application 132 executing on the client device B 130-B presents the notification to the client associated with the client device B 130-B.

Returning to operation (216), if the number of spots that have been claimed does meet or exceed the specified number of spots, the segment management system 110 converts the conditional segment to a confirmed segment and notifies the client that created the conditional segment and the client(s) that claimed a spot on the segment (236). For example, the segment management system 110 can send messages to the clients notifying the clients of the confirmation. The application 132 executing on the client device A 130-A presents the notification to the client that created the segment (240). Similarly, the application 132 executing on the client device B 130-B presents the notification to the client associated with the client device B 130-B.

The segment management system 110 also requests a jet for the segment (228). For example, the segment management system 110 can submit a request to the operator system 142 of one or more operators 140 for one of the operators to source a jet (and its crew) for the segment. The one or more operators can include operators that operate jets in the same geographic area (e.g., same city, state, or other appropriate geographic area) as the area from which the segment is scheduled to depart. The request can specify information about the segment, e.g., the type of jet requested, a minimum number of spots requested, the departure and destination identifiers for the segment, and/or other appropriate information that can be used by the operator system 142 to identify an appropriate jet for the segment.

Each operator system that receives the request identifies a jet for the segment (230). For example, the operator system 142 can access information about the operator's jets and compare the information in the request to the information about the operator's jets to identify a jet that is appropriate for the segment (e.g., a jet that is of the same type as specified by the request and includes the minimum number of spots). The operator system 142 can also access availability or scheduling information for the jets to ensure that the appropriate jet is available for the segment based on the departure date for the segment.

If the operator system 142 identifies an available jet that is appropriate for the segment, the operator system 142 provides information about the jet to the segment management system 110 (232). The information about the jet can include the number of spots on the jet, a cost for the segment, range of the jet, and/or other appropriate information. If operator systems for multiple operators provide information about an available jet, the segment management system 110 can select a jet for the segment based on the information provided by the operator systems 142 (234).

After selecting a jet, the segment management system 110 can notify the operator 140 of the selected jet. In turn, the operator system 142 of the operator 140 can provide a confirmed itinerary for the segment. The segment management system 110 can forward the itinerary to the client that initiated the segment and the client(s) that claimed a spot on the segment, e.g., using message within the application 132. As described above, if there are any available spots on the segment, the segment management system can make those spots available to other clients, e.g., via the application 132.

FIG. 3 is a flow chart of an example process 300 for creating and confirming a conditional segment. Operations of the process 300 can be performed, for example, by one or more data processing apparatus, such as the segment management system 110. Operations of the process 300 can also be implemented as instructions stored on a non-transitory computer readable medium. Execution of the instructions cause one or more data processing apparatus to perform operations of the process 300.

Attributes of a segment created by a creator are received (302). The creator can create the segment through an interface of the device. During the creation process, the creator can specify attributes of the segment using the interface. The creator can also specify how many spots the creator is claiming on the segment.

A determination is made that the attributes specified by the creator include a departure geographic identifier, a destination geographic identifier, a departure date at which the segment will depart, and a type of jet selected for the segment (304). The interface of the device can prompt the creator to specify these attributes or present interface controls that allow the creator to select from multiple options of one or more of the attributes.

Interaction with an interface control that designates the segment as a conditional segment is detected based on data received from the device (306). For example, the interface can present an interface control that allows the creator to select between confirmed and conditional segments. The device can detect the selection made by the creator and provide data specifying the selection. The data can be used to detect the type of segment created by the creator, e.g., either confirmed of conditional.

An expiration time is obtained from the device (308). The expiration time specifies how long the conditional segment is available to others. The expiration time can be obtained in response to detecting the interaction with the interface control designating the segment as a conditional segment. The expiration time can be obtained by presenting an interface control that enables the creator to specify the expiration time. As described above, the expiration time can be limited to a maximum time period that is based on the time at which the conditional segment is initiated and the departure date for the conditional segment. For example, the interface control may limit the duration of the expiration time such that the expiration time elapses at least a specified duration of time before the departure date.

Clients are notified that the conditional segment is available (310). In some implementations, the interfaces of the clients' devices are updated to present information about the conditional segment. For example, a calendar interface may be updated to present a segment indicator for the conditional segment on the departure date of the conditional segment. The calendar interface for a particular client may be updated the next time the client navigates to the calendar interface that would present the segment indicator for the conditional segment, e.g., a calendar interface that presents segments from the same origin and to the same destination as the conditional segment. In some implementations, push notifications are sent to the devices of the other clients. For example, a message can be sent to the devices of clients that may be interested in claiming a spot on the conditional segment. The notifications can specify how many more spots need to be claimed to convert the conditional segment to a confirmed segment.

Clients are enabled to claim a spot on the conditional segment through a client-side application (312). A client can interact with an interface of the application to claim a spot on the conditional segment. For example, the client can interact with (e.g., select) the segment indicator or the departure date for the segment on the calendar interface to view additional information about the conditional segment. The interface that presents the additional information can also include an interface control (e.g., a selectable button or icon) that enables the client to claim a spot on the conditional segment. Similarly, a push notification sent to the client's device can include a link or other interface control that, when selected, presents an interface that enables the client to claim a spot on the conditional segment.

A determination is made whether to convert the conditional segment to a confirmed segment (314). The determination can be based on the number of spots claimed on the conditional segment. For example, the segment service provider may require that at least a specified number of spots be claimed on the segment to convert the conditional segment to a confirmed segment. As such, the segment management system 110 can continually (or periodically) monitor the number of spots that have been claimed, compare the number of spots claimed to the specified number of spots, and determine whether to convert the condition segment to a confirmed segment based on the comparison.

If the number of spots claimed on the conditional segment does not meet or exceed the specified number of spots for the conditional segment when the expiration time lapses, the conditional segment is cancelled (316). If the number of spots claimed on the conditional segment does not meet or exceed the specified number of spots for the conditional segment, the conditional segment is converted to a confirmed segment (318).

In some implementations, the number of spots claimed by the creator is compared to a specified number of spots that are required to be claimed to convert the conditional segment to a confirmed segment after the creator designates the segment as a conditional segment. If the creator has claimed at least the specified number of spots, the conditional segment may be converted to a confirmed segment, e.g., without obtaining the expiration time or notifying other clients of the conditional segment. Some situations, the creator may originally claim fewer than the specified number of spots, but then return to the application to claim additional spots at a later time. In this example, the creator can still specify the expiration time, and other clients will be notified of the conditional segment, but the segment can be converted to a confirmed segment based on the creator proceeding to claim additional spots, thereby bringing the total number of spots claimed by the creator to meet or exceed the specified number of spots.

FIGS. 4A-4I are screenshots of example graphical interfaces for creating a conditional segment. In this particular example, the screenshots illustrated in FIGS. 4A-4I and described below show interfaces for creating a conditional shuttle. However, similar interfaces and techniques can be used to create other types of conditional segments, including conditional charters or other conditional flights. The interfaces can be presented by an application executing on a client device.

Figures 4A, 4B:
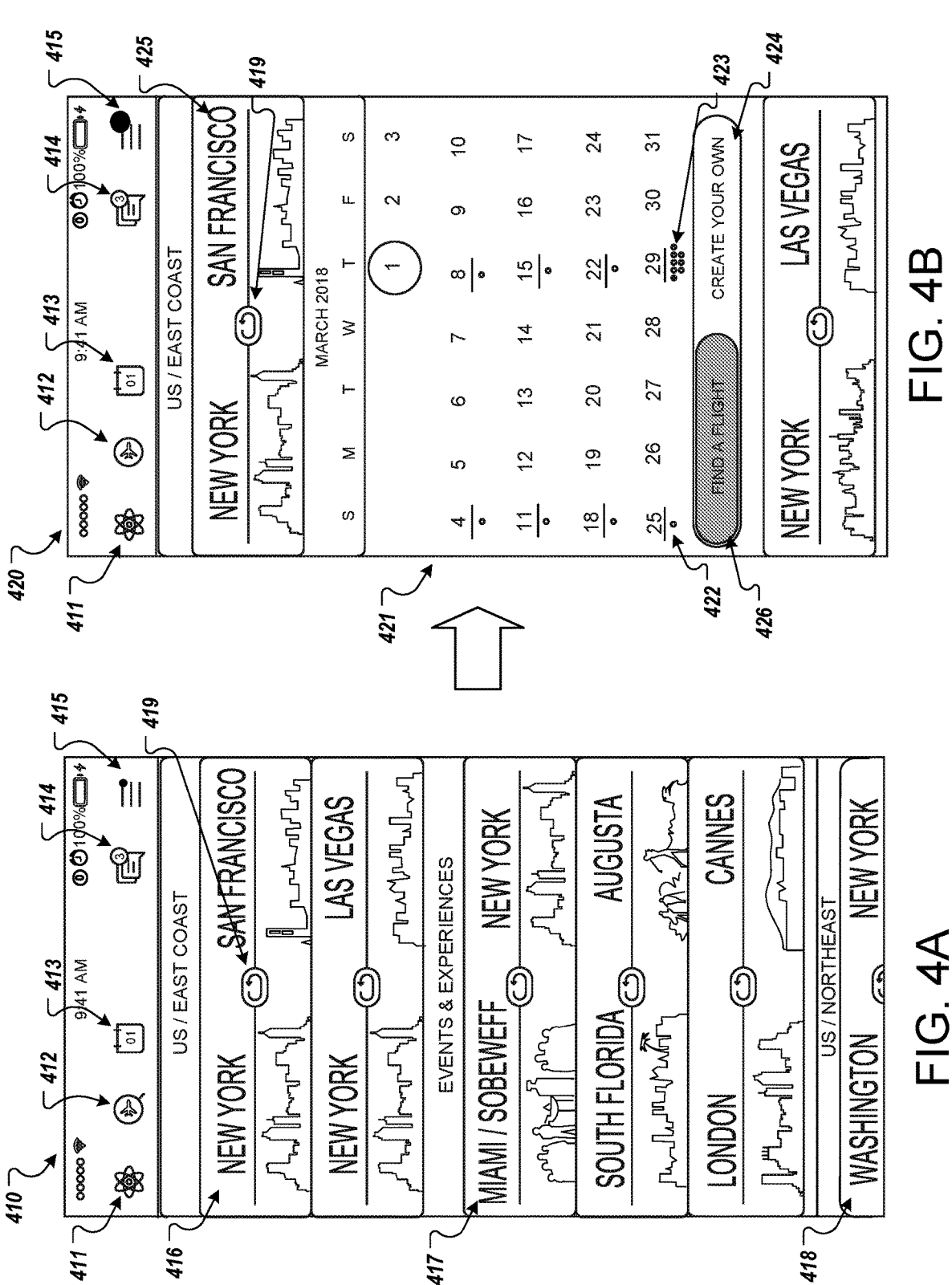
FIGS. 4A-4I are screenshots of examples graphical interfaces for creating a conditional segment.

FIG. 4A is a screenshot of an example route selection interface 410 that enables a client to select a route between two geographic indicators (e.g., two cities). The route selection interface 410 presents routes for which shuttles are available. The routes can be grouped based on various factors, e.g., geography, upcoming events, etc. In this example, a first group of routes 416 for coast-to-coast shuttles in the U.S. is presented at the top of the route selector interface 410. A second group of routes 417 for shuttles to and from cities that will be hosting upcoming events is presented below the first group of routes 416. A third group of routes 418 for routes between northeastern U.S. cities is presented below the second group of routes 417.

There may be additional groups of routes below the third group of routes. For example, the route selection interface 410 can allow a client to scroll down and view additional groups of routes, e.g., by swiping a touchscreen of the device presenting the interface upwards. The routes can be grouped based on the client viewing the route selection interface 410 and/or the groups may be ordered based on the client viewing the route selection interface 410. For example, if the client is located in New York, groups of routes that include New York City can be presented at the top of the route selection interface. Similarly, if a different client has most often been a passenger on shuttles to and from San Francisco, groups of routes that include San Francisco can be presented at the top of the route selection interface 410.

The route selection interface 410 includes, for each route, a route reversal element 419 that, when selected, switches the origin and destination of the route. For example, the city on the left of each route may be the origin and the city on the right of each route may be the destination. In this example, the top route between New York and San Francisco may represent shuttles from New York to San Francisco. The application can reverse the route to represent shuttles from San Francisco to New York in response to selection of the route reversal element 419.

The route selection interface 410 includes a shuttle selector element 411 that, when selected, causes the application to present the route selection interface 410. The route selection interface 410 also includes a charter selector element 412 that, when selected causes the application to present an interface that enable a client to initiate a chartered shuttle from an origin to a destination.

The route selection interface 410 also includes a specials selector element 413 that, when selected, causes the application to present current specials. The route selection interface 410 also includes a messenger selector element 414 that, when selected, causes the application to present a messenger interface to the client. The messenger interface allows the client to view messages sent to the client and/or send messages to other clients or administrators of the shuttle service provider. For example, the messages can include notifications of conditional shuttles on which the client may be interested in claiming a spot. The route selection interface 410 also includes a profile selector element 415 that, when selected, causes the application to present a profile interface that allows the client to manage the client's profile.

FIG. 4B is a screenshot of an example calendar interface 420 that presents a month view 421 of a calendar and shuttle indicators 422 and 423 for shuttles. The application can present the calendar interface 420 in response to user interaction with (e.g., a selection of) a route presented in the route selection interface 410. In this example, the calendar interface 420 is presented in response to a selection of the route from New York to San Francisco, as shown in a route identifier element 425. Similar to the route selection interface 410, the calendar interface 420 includes the shuttle selector element 411, the charter selector element 412, the specials selector element 413, the messenger selector element 414, and the profile selector element 415.

The calendar interface 420 includes zero or more shuttle indicators for each day of the month. In this example, each shuttle indicator is a dot that represents a particular shuttle for the route identified by the route identifier element 425. The shuttle indicator for a particular shuttle is presented under the date that corresponds to the departure date for the particular shuttle. For example, the shuttle indicator 422 represents a shuttle that has a departure date of Mar. 25, 2018, an origin of New York, and a destination of San Francisco. If there is no shuttle indicator under a date, then there are no shuttles scheduled for that date from New York to San Francisco.

The color of the shuttle indicator represents the status of the shuttle. For example, a white shuttle indicator (or another color) can represent a confirmed shuttle that has one or more available spots that a client can claim. A red shuttle indicator (or another color that differs from the color used for the confirmed shuttle) can represent a sold out shuttle that does not have any available spots. A gold shuttle indicator (or another color that differs from both of the colors used for the confirmed shuttle and the sold out shuttle) can represent a conditional shuttle that has at least one spot that needs to be claimed to convert the shuttle to a confirmed shuttle. The shuttle indicators 423 for Mar. 29, 2018 represent one conditional shuttle, two confirmed shuttles with availability, and five sold out shuttles based on the different colors assigned to the dots.

When the shuttle is converted from a conditional shuttle to a confirmed shuttle, the application can update the color of the shuttle indicator for the shuttle, for example, from gold to white or red depending on whether there are any remaining spots on the now confirmed shuttle. If the confirmed shuttle has at least one spot available, the application can update the color of the shuttle indicator, for example, from gold to white to indicate that the shuttle is confirmed and that there is at least one spot left on the shuttle. If one or more clients claim the remaining spots on the confirmed shuttle, the application can update the color of the shuttle indicator from white to red to indicate that the shuttle is no longer available.

The use of color-coded dots in combination with a calendar interface allows users to quickly and easily identify shuttles from an origin to a destination during a relevant time period. This also reduces the number of interactions with the interface for a client to obtain the information needed, which reduces the processing load imposed on the client device's processor by the application. For example, absent this interface design, a client would have to select each date to view the shuttles on those dates and then select each shuttle to determine its status. This interface provides a quick overview of the availability and types of shuttles for a particular route during a particular time period. Note that specific colors are used for purposes of illustration, but that other colors or other types of visual indicators can be used to differentiate between different types of shuttles.

The shuttle indicators or the dates in the month view 421 can be selectable interface controls. For example, the application can present an interface that enables a client to claim a spot on a shuttle in response to selection of the shuttle indicator for the shuttle. If a date has multiple shuttle indicators, selection of the date or shuttle indicators under the date can cause the application to present an interface that enables the client to select between the shuttles and then claim a spot on one of the shuttles. Example user interfaces for claiming a spot on a shuttle are illustrated in FIGS. 5A-5E and described below.

The route identifier element includes a route reversal element 419. If the client selects the route reversal element 419, the application can update the calendar interface 420 to present shuttle indicators for shuttles from San Francisco to New York in the month view 421. In addition, the client can navigate between months by interacting with the calendar interface 420. For example, if the client swipes from right to left across the month view 421, the application can update the calendar interface 420 to present the next month (e.g., April, 2018 in this example) and shuttle indicators for shuttles with departure dates during the next month. If the client swipes from right to left, the application can update the calendar interface to present the previous month (e.g., February, 2018 in this example) and shuttle indicators for the previous month.

The calendar interface 420 also includes creation interface control 424 that enables a client to switch between finding shuttles that have already been scheduled or created and creating a shuttle. A client can switch between finding a shuttle and creating a shuttle by sliding a slider bar 426 of the shuttle creation interface control 424 from one side to the other. If the client slides the slider bar 426 to the "create your own" side of the shuttle creation interface control 424 to switch to creating a shuttle, the application can update the calendar interface 420 to present the calendar interface 430 of FIG. 4C.

Figures 4C, 4D:
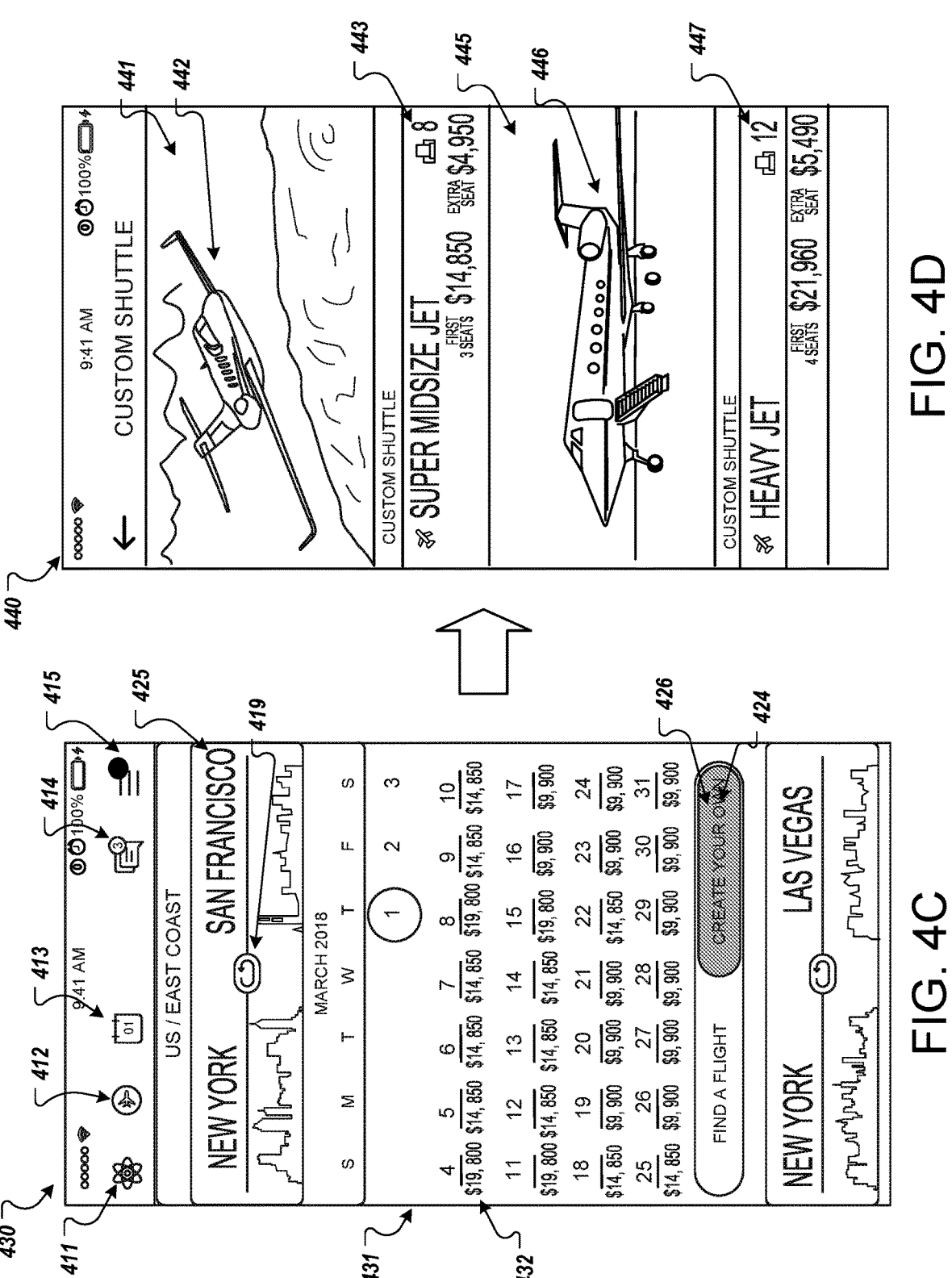

The calendar interface 430 of FIG. 4C includes similar elements as the calendar interface 420 of FIG. 4B, including the shuttle selector element 411, the charter selector element 412, the specials selector element 413, the messenger selector element 414, the profile selector element 415, the route identifier element 425, and the shuttle creation interface control 424.

The calendar interface 430 includes a month view 431 that presents an amount 432 for each day of the month. The amount reflects the amount per spot for a shuttle that is created by the client to travel from the origin (New York) to the destination (San Francisco) on that date. As described above, a client that creates a segment is also referred to as a creator. As shown in FIG. 4C, the amount may vary based on the departure date for the shuttle. The amounts can be determined by the spot assessment engine 118 and provided to the creator's device, e.g., in response to the creator interacting with the shuttle creation interface control 424 to create a shuttle. In another example, the spot assessment engine 118 can provide the amounts prior to the interaction, e.g., in response to selection of the route in the interface 410. In this way, the amounts can be stored locally at the creator's device and presented with less latency than requesting the amounts in response to the interaction with the shuttle creation interface control 424.

The creator can select a date in the month view 431 to create a shuttle on that date. In response to the selection of (or other interaction with) a date, the application can update the interface to present a jet selection interface, e.g., the jet selection interface 440 of FIG. 4D. The jet selection interface 440 presents jet information elements 441 and 445. Assume for the purposes of this example that the client selected a departure date of Mar. 10, 2018. In this example, there are two types of jets available for the shuttle and a respective jet information element for each type of jet. If more than two type of jets are available for the shuttle, more jet information elements could be presented in the jet selection interface 440 or the jet selection interface could allow the creator to scroll down to view additional jet selection elements.

The jet selection element 441 is for a super midsize jet and includes a representative image 442 of a custom midsize jet (e.g., not an image of the actual jet that would be used for the shuttle) and information 443 about custom midsize jets. The information 443 includes a number of spots on the super midsize jet, an amount for the first three spots on the super midsize jet, and an amount for each additional spot. Similarly, the jet selection element 445 is for a heavy jet and includes a representative image 446 of a heavy jet and information 447 about heavy jets. The information 447 includes a number of spots on the heavy jet, an amount for the first three spots on the heavy jet, and an amount for each additional spot.

Figures 4E, 4F:
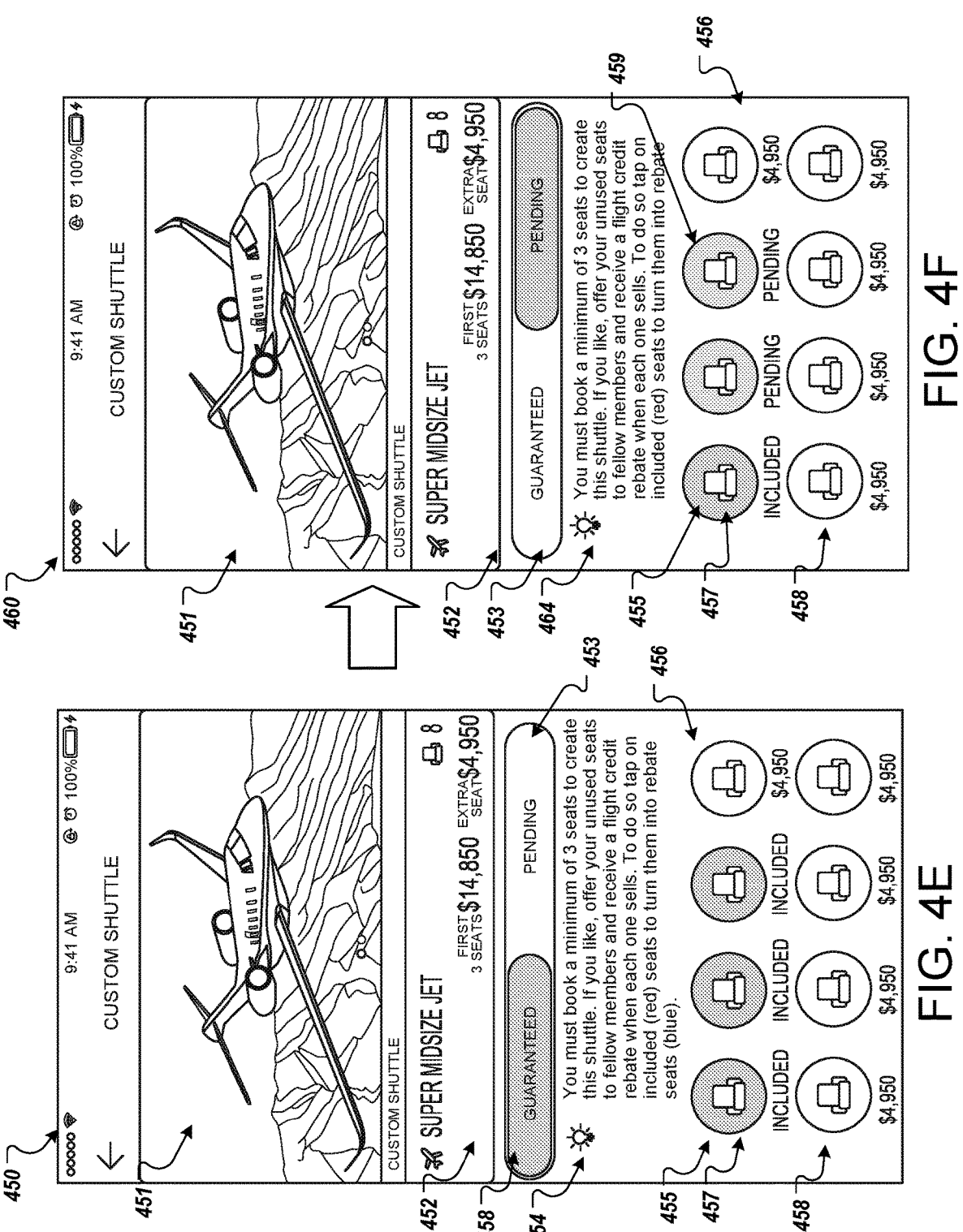

If the creator selects one of the jet selection elements 441 or 446, the application can update the interface to present a shuttle customization interface, e.g., the shuttle customization interface 450 of FIG. 4E. In this example, the shuttle customization interface 450 of FIG. 4E enables the creator to customize a super midsize jet for a shuttle from New York to San Francisco in response to a selection of the jet selection element 441

The shuttle customization interface 450 includes a representative image 452 of a super midsize jet and information 452 about super midsize jets, similar to the jet selection element 441. The shuttle customization interface 450 also includes a conditional shuttle interface control 453 that allows the creator to select between a confirmed shuttle (e.g., guaranteed shuttle) and a conditional shuttle (e.g., pending shuttle). The creator can designate the shuttle as a conditional shuttle by sliding a slider bar 458 of the conditional shuttle interface control 453 to the "pending" side of the conditional shuttle interface control 453. Similarly, the creator can designate the shuttle as a confirmed shuttle by sliding the slider bar 458 of the conditional shuttle interface control 453 to the "guaranteed" side of the conditional shuttle interface control 453. Note that the described sliding can be initiated through a tap or other user interaction with the slider bar 458.

The shuttle customization interface 450 also includes tips 454 on customizing confirmed shuttles when the slider bar 458 of the conditional shuttle interface control 453 is on the "guaranteed" side of the conditional shuttle interface control 453. The shuttle customization interface 450 also includes a seat selection interface control 455 that presents a spot element 456 (e.g., seat icon) for each spot (e.g., seat) on the shuttle. For a confirmed shuttle that is guaranteed at creation, the shuttle service provider can require the creator to claim a specified number of the spots. In this example, the shuttle service provider requires the creator to claim three spots. The three required spots are represented by included spot elements 457 that have a label "included" to indicate that the three spots are included for the creator. The remaining five spots are represented by available spot elements 457 that include an amount for the available spot. The creator can claim more spots by interacting with (e.g., selecting) the available spot elements 457. For example, if the creator wants to claim a total of five spots, the creator can select two of the available spot elements 457. In response, the application can convert the selected available spot elements to included spot elements in the shuttle customization interface 450.

The included spot elements 457 can be presented in a different color than the available spot elements 458. For example, the included spot elements 457 can be presented in red while the available spot elements 458 are presented in grey.

In some implementations, the creator can offer one or more of the required spots to other clients, e.g., by selecting the included spot element 457 for the spot. If the creator offers an included spot, the application can enable other clients to claim the spot. For example, when another client selects the shuttle, e.g., from a calendar interface, the offered spot may be presented as an available spot that can be claimed by the other client. If the creator offers a required spot to other clients, the application can update the shuttle customization interface 450 to present the spot element for the spot in a different color, e.g., in blue. If a client claims one of the offered spots, the shuttle service provider can provide a flight credit (or other credit) to the creator for the spot. The creator may still be responsible for paying the amount for the claimed spot.

If the creator designates the shuttle as a conditional shuttle using the conditional shuttle interface control 453, the application can update the interface to present a conditional shuttle customization interface, e.g., the conditional shuttle customization interface 460 of FIG. 4F. In the conditional shuttle customization interface 460, the application converts the spot elements 457 for some of the required spots to pending spot elements 459. The pending spot elements 458 represent the number of spots that other clients would be required to claim to convert the conditional shuttle to a confirmed shuttle. In this example, the shuttle service provider requires a total of three claimed spots and the creator has a minimum of one claimed spot. Initially, the application may convert all but one of the included spots to pending spots and convert all but one of the included spot elements 457 to pending spot elements 459 to reflect the conversion. The creator can then interact with (e.g., select) a pending spot element 459 to reclaim the pending spot, e.g., for someone traveling with the creator. Each pending spot not claimed by the creator can then be made available to other clients.

The pending spot elements 459 can be presented in a different color than the included spot elements 457 for the included spots and the available spot elements 458. For example, the pending spot elements 459 can be presented in gold to match the conditional shuttles in the calendar interfaces.

The conditional shuttle customization interface 460 also includes tips 464 on customizing conditional shuttles when the slider bar 458 of the conditional shuttle interface control 453 is on the "pending" side of the conditional shuttle interface control 453. If the creator slides the slider bar 458 back to the "guaranteed" side of the conditional shuttle interface control 453, the application can update the interface to present the shuttle customization interface 450 of FIG. 4E. For example, the application can convert the pending spots back to included spots and convert the pending spot elements 459 back to included spot elements 457.

Figures 4G, 4H:
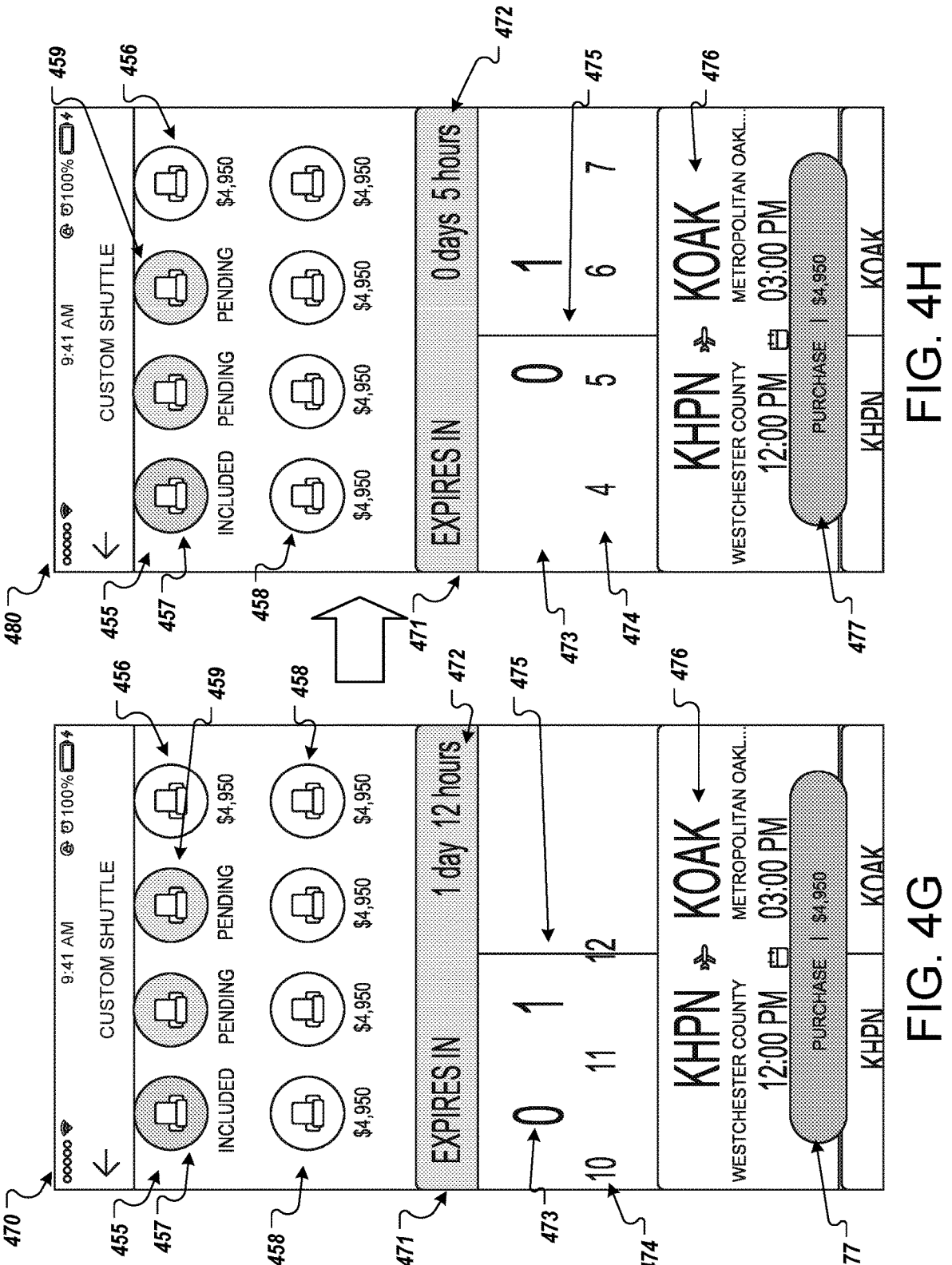

The application can update the interface to present an expiration time selection interface 470 of FIG. 4G. In some implementations, the expiration time selection interface 470 is presented in response to the creator swiping a touchscreen of the device upwards to scroll down or otherwise scrolling down in the conditional shuttle customization interface 460.

For example, the top portion of the expiration time selection interface 470 includes the bottom portion of the conditional shuttle customization interface 460 in which the spot elements 456 are presented.

The expiration time selection interface 470 includes an expiration time interface control 471. The expiration time interface control 471 enables the creator to specify an expiration time for the conditional shuttle. The expiration time interface control 471 includes an expiration time indicator 472 that presents the currently specified expiration time. The expiration time interface control 471 also includes a first row of numbers 473 that represent days and a second row of numbers 474 that represents hours. The number of days and the number of hours in the two rows can be limited based on the maximum time period to which the expiration time is limited for the shuttle. The second row of numbers can include repeating sets of the numbers one through twenty-four.

The expiration time interface control 471 also includes a line 475 on which (or near) the creator can align a number in the first row of numbers and a number in the second row of numbers to set the expiration time. In the illustrated position, the expiration time is one day and twelve hours based on the number one (one day) in the first row of numbers 473 being to the left of the line 475 (without the number two being on or to the left of the line 475) and the number twelve (twelve hours) in the second row of numbers 474 being on the line 475.

The creator can cause each row of numbers to move, e.g., by swiping the rows of numbers to the left or right. For example, swiping to the right within the expiration time interface control 471 can cause the second row of numbers to move to the right going from higher numbers to lower numbers. The first row of numbers can move in the same direction but an amount that corresponds to the number of hours the second row of numbers has moved. For example, if the creator causes the second row of numbers to move from the twelve to the next zero by swiping to the right, the first row of numbers may move to the right an amount that corresponds to half a day. In other examples, the creator can move each row of numbers individually to specify the expiration time. Of course, other interface controls, such as text entry boxes, clock interfaces, etc. could also be used to specify the expiration time. In this example, the creator has specified an expiration time of zero days and five hours, as shown in the expiration time selection interface 470 of FIG. 4H.

The expiration time selection interfaces 470 and 480 include a shuttle information element 476 that presents information about the conditional shuttle, e.g., the departure geographic identifier, the destination geographic identifier, and the departure time. This information can be updated by the creator, e.g., by interacting with the shuttle information element 476. For example, the creator can select the departure geographic identifier to change the departure city or airport for the conditional shuttle.

The expiration time selection interfaces 470 and 480 also includes a confirmation element 475 that enables the user to complete the creation of the conditional shuttle, e.g., after specifying the expiration time for the conditional shuttle. If the creator selects the confirmation element 475, the application transmits the attributes of the conditional shuttle to the shuttle management system 110 of FIG. 1.

Figure 4I:
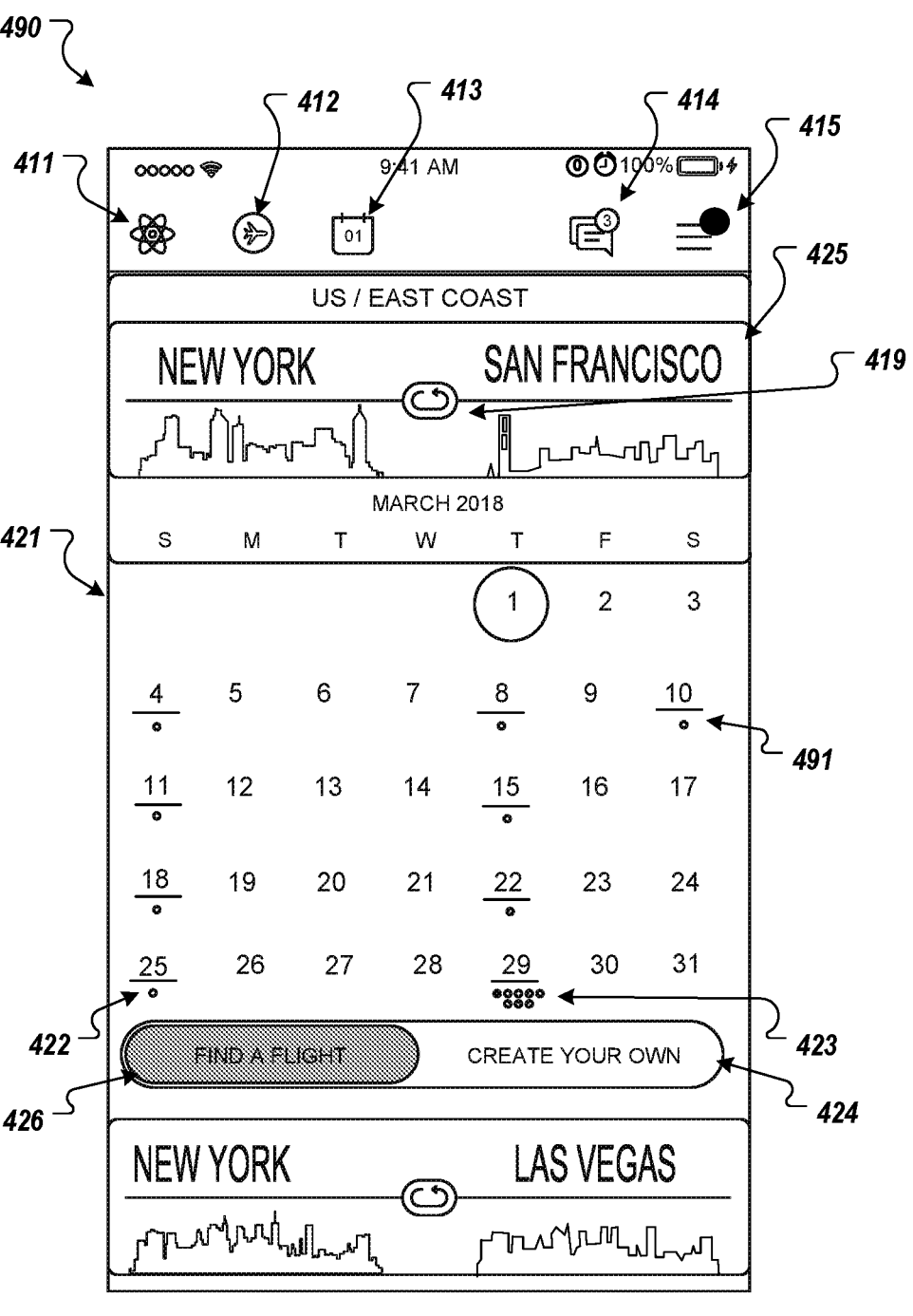

In response, the shuttle management system 110 can notify other clients of the conditional shuttle, as described above. For example, when other clients navigate to the calendar interface 420 for the month of March, 2018 and for shuttles from New York to San Francisco, an orange shuttle indicator (e.g., dot) will be presented under the departure date (Mar. 10, 2018) for the conditional shuttle, as shown in FIG. 4I. FIG. 4I is a screenshot of an example calendar interface 490. The calendar interface 490 includes many of the same elements as the calendar interface of 420 of FIG. 4B. However, the calendar interface 490 has been updated related to the calendar interface 420 of FIG. 4B to include a shuttle indicator 491 for the client-initiated conditional shuttle under the departure date of Mar. 10, 2018. The clients can interact with the shuttle indicator 491 or the departure date to view information about the conditional shuttle and/or claim a spot on the conditional shuttle. If the conditional shuttle is converted to a confirmed shuttle, the color of the shuttle indicator 491 can be updated to white. If all of the available spots on the shuttle are claimed, the color of the shuttle indicator 491 can be updated to red.

In some implementations, when the shuttle management system 110 of FIG. 1 converts a conditional shuttle to a confirmed shuttle, the shuttle management system 110 may remove the shuttle indicator 491 for the shuttle from the calendar interface until a jet is sourced from an operator for the shuttle. Once a jet is confirmed from an operator, the shuttle management system 110 can add an updated shuttle indicator (e.g., a white shuttle indicator) for the confirmed shuttle back to the calendar interface to allow other clients to claim a spot on the shuttle. This allows the shuttle management system 110 the ability to determine whether the actual jet will have available spots over the number of spots claimed by the creator and the other clients. If so, the shuttle management system 110 can add the white shuttle indicator to the calendar interface. If not, the shuttle management system 110 can add a red shuttle indicator to the calendar interface to indicate that there is a shuttle, but that the shuttle is full.

FIGS. 5A-5E are screenshots of example graphical interfaces for claiming a spot on a conditional segment. In this particular example, the screenshots illustrated in FIGS. 5A-5E and described below show interfaces for claiming a spot on a conditional shuttle. However, similar interfaces and techniques can be used to claim a spot on other types of conditional segments, including conditional charters or other conditional flights. The interfaces can be presented by an application executing on a client device.

Figures 5A, 5B:
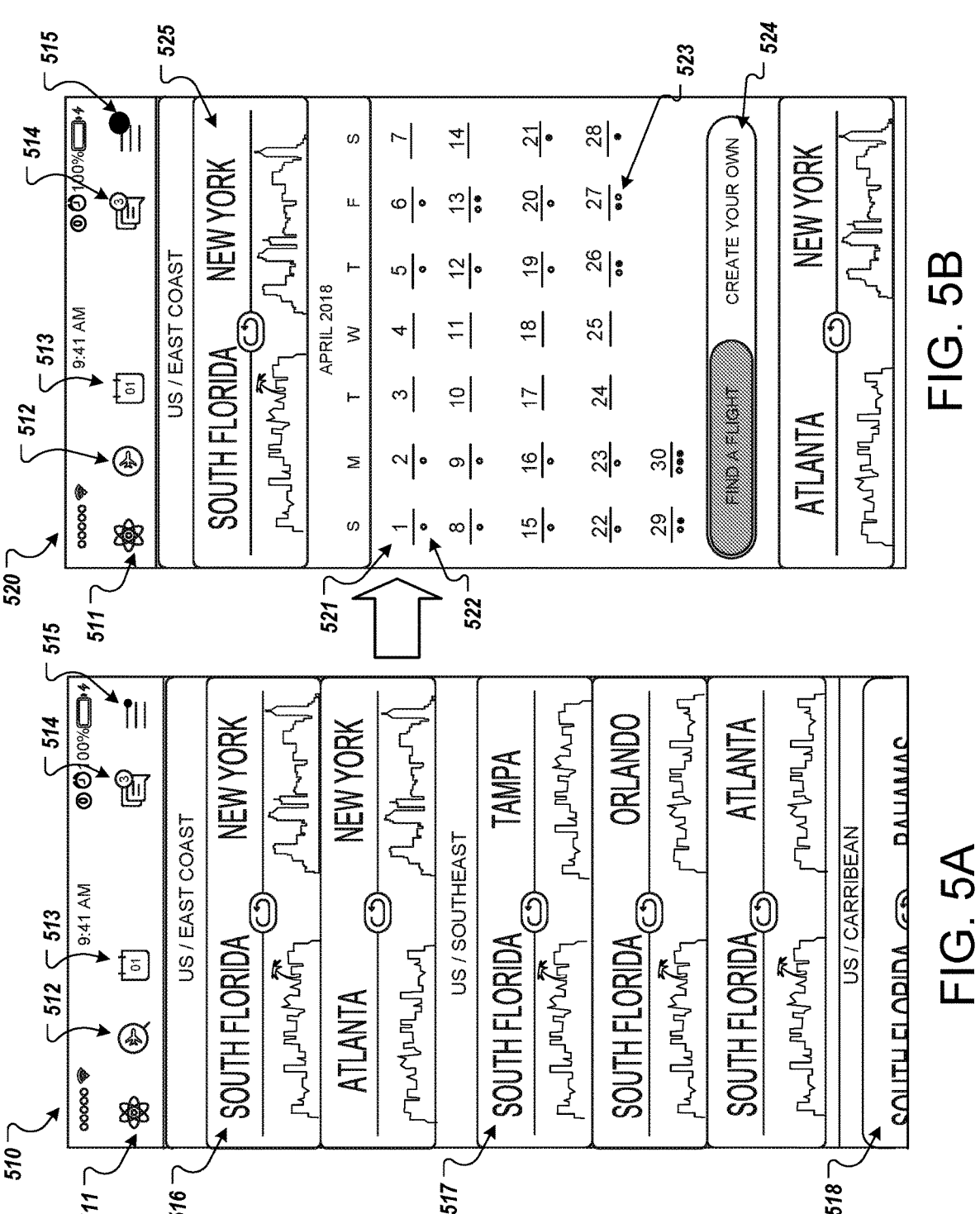
FIGS. 5A-5E are screenshots of example graphical interfaces for claiming a spot on a conditional segment.

FIG. 5A is a screenshot of an example interface 510 that presents an example route selection interface 510 that enables a client to select a route between two geographic indicators (e.g., two cities). The route selection interface 510 is similar to the route selection interface 410 of FIG. 4A. For example, the route selection interface 510 includes three groups of routes 516-518, a shuttle selector element 511, a charter selector element 512, a specials selector element 513, a messenger selector element 514, and a profile selector element 515. If the client selects one of the routes, the application can update the interface to present a calendar interface, e.g., the calendar interface 520 of FIG. 5B.

In this example, the calendar interface 520 is presented in response to a selection of the route from South Florida to New York, as shown in a route identifier element 525. Similar to the route selection interface 510, the calendar interface 520 includes the shuttle selector element 511, the charter selector element 512, the specials selector element 513, the messenger selector element 514, and the profile selector element 515.

The calendar interface 520 includes zero or more shuttle indicators for each day of the month. In this example, each shuttle indicator is a dot that represents a particular shuttle for the route identified by the route identifier element 525. The shuttle indicator for a particular shuttle is presented under the date that corresponds to the departure date for the particular shuttle. For example, the shuttle indicator 522 represents a shuttle that has a departure date of Apr. 1, 2018, an origin of South Florida, and a destination of New York. If there is no shuttle indicator under a date, then there are no shuttles scheduled for that date from South Florida to New York.

As described above, the color of the shuttle indicator represents the status of the shuttle. For example, a white shuttle indicator can represent a confirmed shuttle that has one or more available spots that a client can claim. A red shuttle indicator can represent a sold out shuttle that does not have any available spots. A gold shuttle indicator can represent a conditional shuttle that has at least one spot that needs to be claimed to convert the shuttle to a confirmed shuttle. The shuttle indicators 523 for Apr. 27, 2018 represent one conditional shuttle and one confirmed shuttle with availability. The calendar interface 520 also includes shuttle creation interface control 524, similar to the shuttle creation user interface 424 of FIG. 4B.

Figures 5C, 5D:
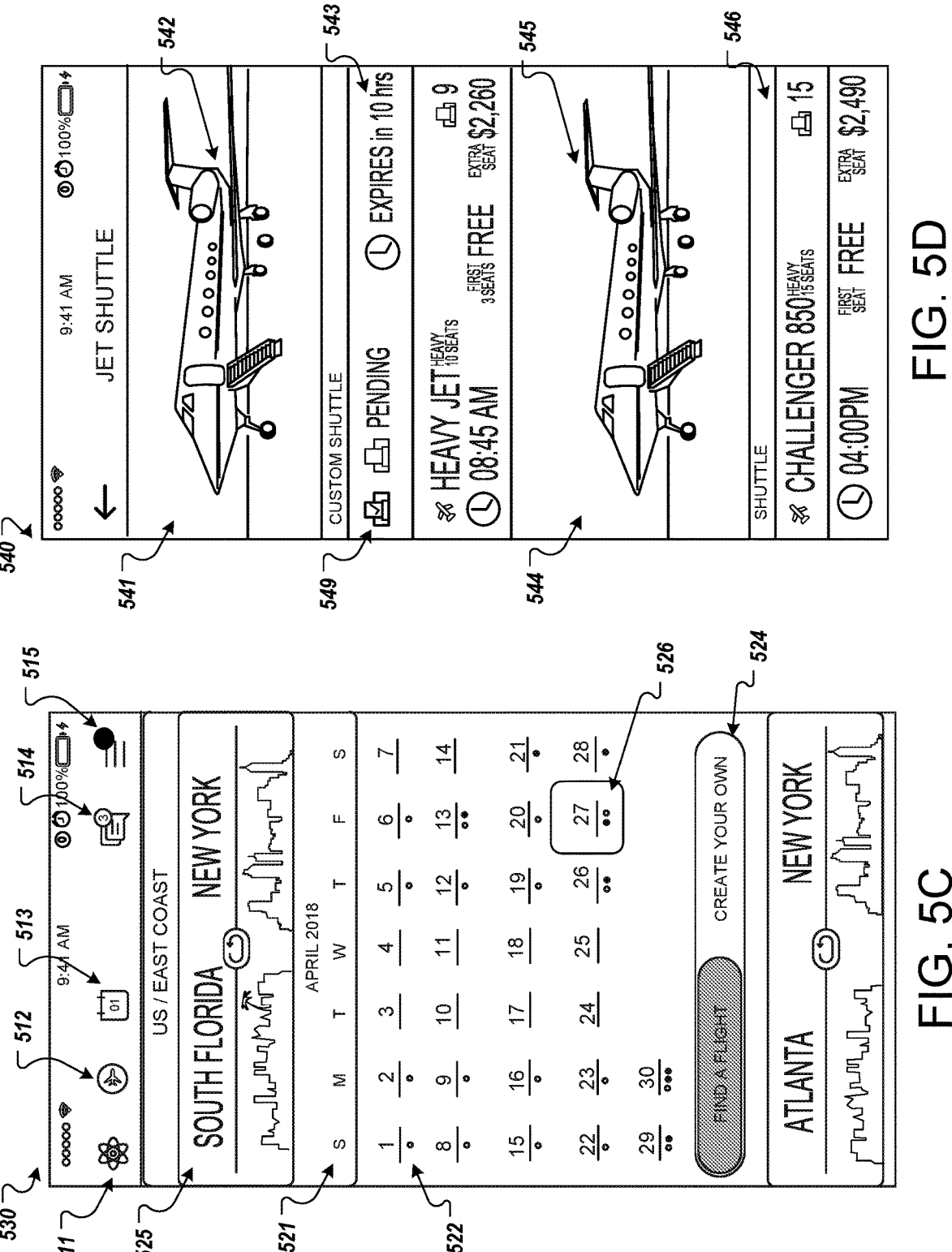
Figure 5E:
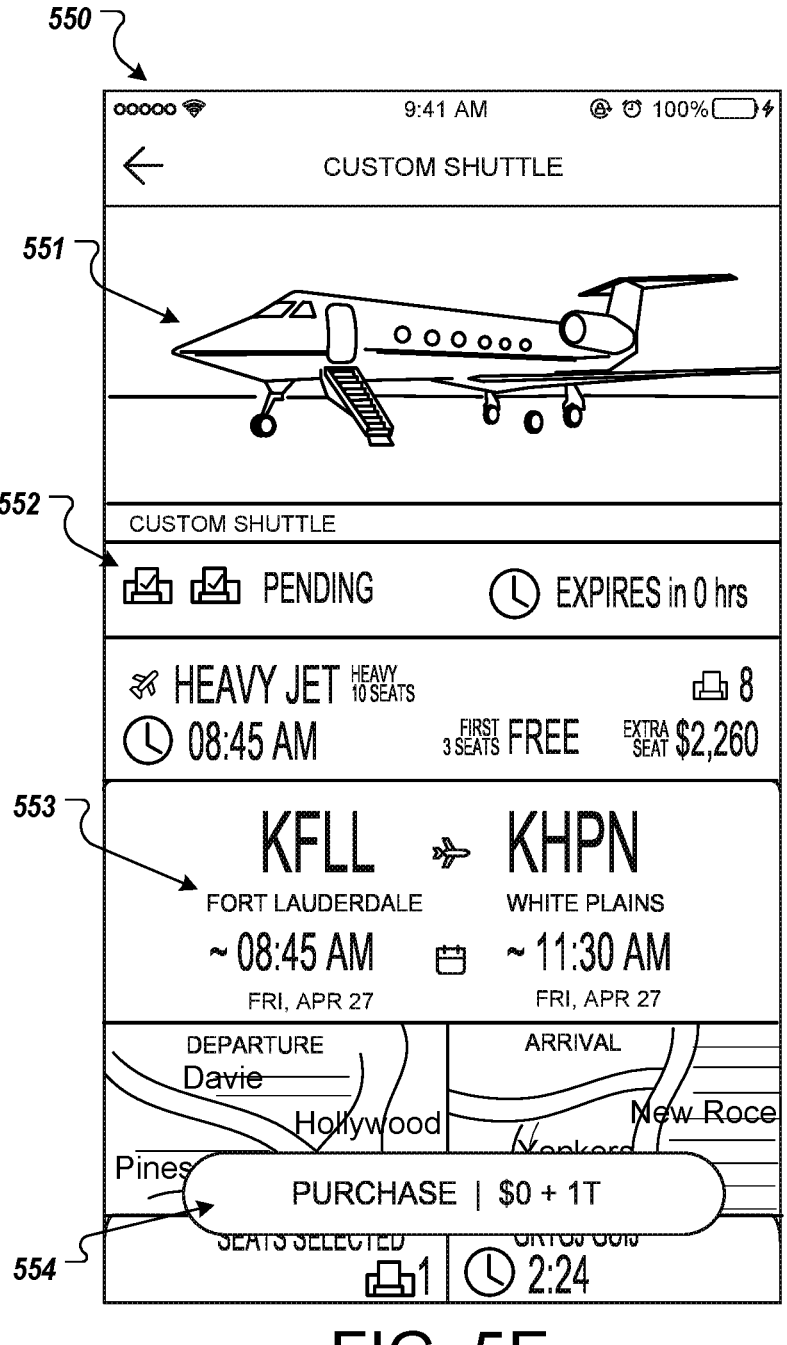

To claim a spot on one of the shuttles, the client can select one of the shuttle indicators or data. For example, FIG. 5C is a screenshot of a calendar interface 530 in which a client has selected a date. The calendar interface 530 is similar to the calendar interface 520 of FIG. 5C. However, the calendar interface 530 has been updated to highlight the client's selection of the date Apr. 27, 2018 using a highlight box 526. Then highlight box 526 provides feedback to the client of the date the application detected being selected by the client.

In response to the selection of a date, the application can present a shuttle selection interface, e.g., the shuttle selection interface 540 of FIG. 5D. The shuttle selection interface allows the client to select from multiple shuttles available on the selected date. If only one shuttle is available on the selected date, then the shuttle selection interface 540 may present information about the available shuttle only.

The shuttle selection interface 540 includes two shuttle information elements 541 and 544. Each shuttle information element 541 and 544 includes information for a respective available shuttle. The shuttle information element 541 includes a representative image 541 of the type of jet selected for the shuttle and information 543 about the shuttle. The information 543 indicates that the shuttle is a custom shuttle created by a creator, that the shuttle is conditional (e.g., pending), and that the shuttle expires in ten hours. The shuttle information element 541 can also show the number of minutes and/or second until the shuttle expires.

The color of portions of the shuttle information element 541 can be based on the status of the shuttle. For example, as the shuttle is conditional, the background color of the shuttle information element where the pending status and expiration time are presented may be gold to indicate the conditional status of the shuttle. If the shuttle is confirmed, the color may be blue to indicate that the shuttle is confirmed.

The shuttle information element 541 also includes a spot indicator 549 that indicates the number of spots claimed (with a checkmark in the spot) and the number of spots remaining to be claimed (without a checkmark in the spot) to convert the conditional shuttle to a confirmed shuttle. In this example, there is one spot with a checkmark and one spot without a checkmark. Thus, one spot has been claimed and one spot is still required to be claimed before the conditional shuttle is converted to a confirmed shuttle.

The shuttle information element 544 includes a representative image 545 of the type of jet selected for the shuttle and information 546 about the shuttle. The information 546 indicates that the shuttle is a confirmed shuttle. The information does not indicate that the shuttle is a custom shuttle, so the shuttle may be a regularly scheduled shuttle by the shuttle service provider. As the shuttle is confirmed, the background color of portions of the shuttle information element may blue.

The client can select one of the shuttle information elements 541 or 544 to claim a spot on the shuttle represented by the selected shuttle information element. In response to the selection, the application can present a confirmation interface, e.g., the confirmation interface 550 of FIG. 5E. In this example, the client has selected the conditional shuttle represented by the shuttle information element 541. The confirmation interface 550 includes a representative image 551 of the type of jet selected for the shuttle, an information element 552 with information about the shuttle (similar to the information element 543 of FIG. 5D), an estimated itinerary element 553 with information about the estimated itinerary for the shuttle, and a confirmation element 554. The client can claim a spot on the shuttle by selecting the confirmation element 554.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
receiving, from a device of a creator, one or more attributes of a segment created by the creator through an interface presented at the device;
determining, based on data received from the device, that interaction with an interface control of a user interface that designates the segment as a conditional segment has occurred;
in response to determining the interaction with the interface control of the user interface, designating the segment as the conditional segment for which one or more additional spots must be claimed prior to converting the conditional segment to a confirmed segment;
transmitting, to a plurality of devices associated with one or more clients, a notification indicating that the conditional segment is available to claim a spot, the notification comprising data that initiates presentation of a user interface that shows the spots on the conditional segment, and for each a spot in the segment, a status indicator that indicates whether the spot is (i) an included spot that is included for the creator of the conditional segment, (ii) an additional spot that must be claimed prior to converting the conditional segment to the confirmed segment, or (iii) an additional available spot that is available after the one or more additional spots are claimed;
determining that one or more spots on the conditional segment are claimed by one or more of the clients;
designating the conditional segment as a confirmed segment in response to determining that a number of spots claimed by the one or more clients on the conditional segment satisfies a threshold number of spots;
in response to designating the conditional segment as the confirmed segment, identifying selecting, from a plurality of available jets, a jet for the confirmed segment that (i) includes the number of spots claimed by the one or more clients on the conditional segment and (ii) at least a threshold number of additional available spots available for subsequent reservation by other clients, after reserving the number of spots claimed by one or more of the clients on the jet; and
in response to selecting the jet for the confirmed segment, transmitting, to each device of the plurality of devices, data that causes the device to update the user interface to add a graphical user interface element to the user interface, wherein the graphical user interface element enables the user of the device to view a number of unclaimed spots remaining on the selected jet and to claim one or more of the unclaimed spots on the selected jet of the confirmed segment.

2. The method of claim 1, wherein, in response to designating the conditional segment as the confirmed segment, the method comprises:
identifying one or more operators for sourcing the jet for the confirmed segment, including identifying at least one operator that operates jets in a geographic region from which the confirmed segment is scheduled to depart; and providing a request to the one or more identified operators for sourcing the jet for the confirmed segment.

3. The method of claim 2, wherein the request comprises information about the confirmed segment that includes (i) a requested type of the jet, (ii) a minimum number of spots requested, (iii) a departure identifier for the confirmed segment, and (iv) a destination identifier for the confirmed segment.

4. The method of claim 2, further comprising:

in response to providing the request to the one or more identified operators for sourcing the jet for the confirmed segment:

receiving, from the one or more identified operators, information about one or more jets for the confirmed segment, wherein the received information about the one or more jets comprises (i) a number of spots on the jet, (ii) a cost for the confirmed segment, and (iii) a range of the jet.

5. The method of claim 1, further comprising:

in response to identifying the jet for the confirmed segment, generating an itinerary for the confirmed segment; and providing the generated itinerary to the creator and to the one or more clients who claimed a spot on the segment.

6. The method of claim 5, further comprising:

updating, on each device of the plurality of devices, the user interface presented to the clients to include (i) image data representative of the selected jet and (ii) information about the selected jet.

7. The method of claim 1, wherein transmitting the notification indicating that the conditional segment is available to claim the spot further comprises:

updating, on each device of the plurality of devices, the user interface presented to the clients to include (i) a graphical user interface element indicating a number of spots previously claimed on the segment, (ii) a graphical user interface element indicating a number of spots remaining to be claimed on the segment, and (iii) information about an estimated itinerary for the segment.

8. The method of claim 7, wherein the user interface comprises a calendar interface that comprises zero or more segment indicators for each day of a month, and each displayed segment indicator is a particular color that indicates a type of the segment.

9. The method of claim 1, wherein transmitting the notification indicating that the conditional segment is available to claim the spot through each device of the plurality of devices further comprises updating, on each device of the plurality of devices, the user interface presented to the clients to include information that indicates an expiration time remaining for the conditional segment to convert to the confirmed segment.

10. A system comprising:

one or more computers and one or more storage devices storing instructions that are operable, when executed by the one or more computers, to cause the one or more computers to perform operations comprising:

receiving, from a device of a creator, one or more attributes of a segment created by the creator through an interface presented at the device;

determining, based on data received from the device, that interaction with an interface control of a user interface that designates the segment as a conditional segment has occurred;

in response to determining the interaction with the interface control of the user interface, designating the segment as the conditional segment for which one or more additional spots must be claimed prior to converting the conditional segment to a confirmed segment;

transmitting, to a plurality of devices associated with one or more clients, a notification indicating that the conditional segment is available to claim a spot, the notification comprising data that initiates presentation of a user interface that shows the spots on the conditional segment, and for each a spot in the segment, a status indicator that indicates whether the spot is (i) an included spot that is included for the creator of the conditional segment, (ii) an additional spot that must be claimed prior to converting the conditional segment to the confirmed segment, or (iii) an additional available spot that is available after the one or more additional spots are claimed;

determining that one or more spots on the conditional segment are claimed by one or more of the clients;

designating the conditional segment as a confirmed segment in response to determining that a number of spots claimed by the one or more clients on the conditional segment satisfies a threshold number of spots;

in response to designating the conditional segment as the confirmed segment, selecting, from a plurality of available jets, a jet for the confirmed segment that (i) includes the number of spots claimed by the one or more clients on the conditional segment and (ii) at least a threshold number of additional available spots available for subsequent reservation by other clients, after reserving the number of spots claimed by one or more of the clients on the jet; and in response to selecting the jet for the confirmed segment, transmitting, to each device of the plurality of devices, data that causes the device to update the user interface to add a graphical user interface element to the user interface, wherein the graphical user interface element enables the user of the device to view a number of unclaimed spots remaining on the selected jet and to claim one or more of the unclaimed spots on the selected jet of the confirmed segment.

11. The system of claim 10, wherein, in response to designating the conditional segment as the confirmed segment, the operations comprise:

identifying one or more operators for sourcing the jet for the confirmed segment, including identifying at least one operator that operates jets in a geographic region from which the confirmed segment is scheduled to depart; and providing a request to the one or more identified operators for sourcing the jet for the confirmed segment.

12. The system of claim 11, wherein the request comprises information about the confirmed segment that includes (i) a requested type of the jet, (ii) a minimum number of spots requested, (iii) a departure identifier for the confirmed segment, and (iv) a destination identifier for the confirmed segment.

13. The system of claim 11, further comprising:

in response to providing the request to the one or more identified operators for sourcing the jet for the confirmed segment:

receiving, from the one or more identified operators, information about one or more jets for the confirmed segment, wherein the received information about the one or more jets comprises (i) a number of spots on the jet, (ii) a cost for the confirmed segment, and (iii) a range of the jet.

14. The system of claim 13, further comprising:

in response to selecting the jet for the confirmed segment, generating an itinerary for the confirmed segment; and providing the generated itinerary to the creator and to the one or more clients who claimed a spot on the segment.

15. The system of claim 14, further comprising:

updating, on each device of the plurality of devices, the user interface presented to the clients to include (i) image data representative of the selected jet and (ii) information about the selected jet.

16. The system of claim 10, wherein transmitting the notification indicating that the conditional segment is available to claim the spot further comprises:

updating, on each device of the plurality of devices, the user interface presented to the clients to include (i) a graphical user interface element indicating a number of spots previously claimed on the segment, (ii) a graphical user interface element indicating a number of spots remaining to be claimed on the segment, and (iii) information about an estimated itinerary for the segment.

17. The system of claim 16, wherein the user interface comprises a calendar interface that comprises zero or more segment indicators for each day of a month, and each displayed segment indicator is a particular color that indicates a type of the segment.

18. The system of claim 10, wherein transmitting the notification indicating that the conditional segment is available to claim the spot through each device of the plurality of devices further comprises updating, on each device of the plurality of devices, the user interface presented to the clients to include information that indicates an expiration time remaining for the conditional segment to convert to the confirmed segment.

19. A non-transitory computer-readable medium storing software comprising instructions executable by one or more computers which, upon such execution, cause the one or more computers to perform operations comprising:

receiving, from a device of a creator, one or more attributes of a segment created by the creator through an interface presented at the device;

determining, based on data received from the device, that interaction with an interface control on a user interface that designates the segment as a conditional segment has occurred;

in response to determining the interaction with the interface control of the user interface, designating the segment as the conditional segment for which one or more additional spots must be claimed prior to converting the conditional segment to a confirmed segment;

transmitting, to a plurality of devices associated with one or more clients, a notification indicating that the conditional segment is available to claim a spot, the notification comprising data that initiates presentation of a user interface that shows the spots on the conditional segment, and for each a spot in the segment, a status indicator that indicates whether the spot is (i) an included spot that is included for the creator of the conditional segment, (ii) an additional spot that must be claimed prior to converting the conditional segment to the confirmed segment, or (iii) an additional available spot that is available after the one or more additional spots are claimed;

determining that one or more spots on the conditional segment are claimed by one or more of the clients;

designating the conditional segment as a confirmed segment in response to determining that a number of spots claimed by the one or more clients on the conditional segment satisfies a threshold number of spots;

in response to designating the conditional segment as the confirmed segment, identifying selecting, from a plurality of available jets, a jet for the confirmed segment that (i) includes the number of spots claimed by the one or more clients on the conditional segment and (ii) at least a threshold number of additional available spots available for subsequent reservation by other clients, after reserving the number of spots claimed by one or more of the clients on the jet; and in response to selecting the jet for the confirmed segment, transmitting, to each device of the plurality of devices, data that causes the device to update the user interface to add a graphical user interface element to the user interface, wherein the graphical user interface element enables the user of the device to view a number of unclaimed spots remaining on the selected jet and to claim one or more of the unclaimed spots on the selected jet of the confirmed segment.

20. The non-transitory computer-readable medium according to claim 19, wherein, in response to designating the conditional segment as the confirmed segment, the operations comprise:

identifying one or more operators for sourcing the jet for the confirmed segment, including identifying at least one operator that operates jets in a geographic region from which the confirmed segment is scheduled to depart; and providing a request to the one or more identified operators for sourcing the jet for the confirmed segment.

* * * * *